(12) United States Patent
Elsey

(10) Patent No.: US 9,216,547 B2
(45) Date of Patent: Dec. 22, 2015

(54) METHOD AND APPARATUS FOR MAKING AN OBJECT

(71) Applicant: ZYDEX PTY LTD, St Peters (AU)

(72) Inventor: Justin Elsey, St Peters (AU)

(*) Notice: Subject to any disclaimer, the term of this patent is extended or adjusted under 35 U.S.C. 154(b) by 0 days.

(21) Appl. No.: 14/367,994

(22) PCT Filed: Dec. 21, 2012

(86) PCT No.: PCT/AU2012/001568
§ 371 (c)(1),
(2) Date: Jun. 23, 2014

(87) PCT Pub. No.: WO2013/091003
PCT Pub. Date: Jun. 27, 2013

(65) Prior Publication Data
US 2015/0014881 A1 Jan. 15, 2015

(30) Foreign Application Priority Data
Dec. 24, 2011 (AU) .................. 2011905447

(51) Int. Cl.
| | |
|---|---|
| *B29C 41/02* | (2006.01) |
| *B29C 67/24* | (2006.01) |
| *B29C 33/38* | (2006.01) |
| *B29C 67/00* | (2006.01) |
| *B33Y 10/00* | (2015.01) |
| *B33Y 30/00* | (2015.01) |
| *B29K 61/00* | (2006.01) |
| *B29K 83/00* | (2006.01) |
| *B29K 101/12* | (2006.01) |
| *B29K 105/00* | (2006.01) |

(52) U.S. Cl.
CPC ........... *B29C 67/246* (2013.01); *B29C 33/3842* (2013.01); *B29C 67/0059* (2013.01); *B29C 67/0066* (2013.01); *B29C 67/0081* (2013.01); *B29C 67/0092* (2013.01); *B33Y 10/00* (2014.12); *B33Y 30/00* (2014.12); *B29K 2061/00* (2013.01); *B29K 2083/00* (2013.01); *B29K 2101/12* (2013.01); *B29K 2105/0002* (2013.01)

(58) Field of Classification Search
CPC ............ B29C 33/3842; B29C 67/0059; B29C 67/0081
USPC ......................................... 264/113, 219, 308
See application file for complete search history.

(56) References Cited

U.S. PATENT DOCUMENTS

| | | | |
|---|---|---|---|
| 2001/0046642 A1 | 11/2001 | Johnson et al. | |
| 2002/0016386 A1* | 2/2002 | Napadensky | ................. 523/201 |

(Continued)

FOREIGN PATENT DOCUMENTS

| | | |
|---|---|---|
| EP | 904158 B1 | 7/2002 |
| WO | WO 2012/045660 A1 | 4/2012 |

OTHER PUBLICATIONS

International Preliminary Report on Patentability dated May 23, 2014 in PCT Application No. PCT/AU2012/001568.

*Primary Examiner* — Leo B Tentoni
(74) *Attorney, Agent, or Firm* — Eric L. Lane; Green Patent Law

(57) ABSTRACT

The invention relates to a method for making an object, the method comprising forming a plurality of sections of the object, wherein the formation of each of the plurality of sections comprises applying at least two substances within an area having the shape of the section being formed, the at least two substances being able to chemically react upon contact with each other to form the section. The invention also relates to an apparatus for making an object, the apparatus comprising: an applicator arranged to apply at least two substances within an area having a shape of a section of the object being made, the at least two substances being able to chemically react upon contact with each other to form the section.

20 Claims, 9 Drawing Sheets

(56) References Cited

U.S. PATENT DOCUMENTS

| | | |
|---|---|---|
| 2004/0151935 A1 | 8/2004 | Dzugan et al. |
| 2005/0014005 A1* | 1/2005 | Kramer et al. ............... 428/413 |
| 2005/0015171 A1* | 1/2005 | Cruz-Uribe et al. ......... 700/118 |
| 2005/0074596 A1* | 4/2005 | Nielsen et al. ........... 264/497 X |
| 2005/0080191 A1* | 4/2005 | Kramer et al. ............... 525/191 |
| 2005/0288813 A1 | 12/2005 | Yang et al. |
| 2006/0118990 A1 | 6/2006 | Dierkes et al. |
| 2006/0131770 A1 | 6/2006 | Dierkes et al. |
| 2006/0208388 A1* | 9/2006 | Bredt et al. .................. 264/123 |

\* cited by examiner

METHOD AND APPARATUS FOR MAKING AN OBJECT

FIELD OF THE INVENTION

The present invention relates to a method for making an object and an apparatus for making an object.

BACKGROUND OF THE INVENTION

Some object fabrication techniques, such as rapid prototyping, build a three dimensional object one layer at a time. A layer of material is formed in the shape of a planar section through the object. Once the layer is formed another is formed in contact with the previous layer. Repetition of this process progressively fabricates an object.

Some processes form objects from a starting material that is a wax or a plastic that can melt. The starting material is melted and the melted material applied. The applied starting material forms a layer of the object on cooling. The object has the chemical and physical properties of the starting material. The process generally requires that the melted starting material has a relatively low viscosity. Starting materials that have a low viscosity in their melted state, however, are generally weak or brittle in their solid state. Weak or brittle objects have limited utility.

Other processes form objects from a starting material that is a liquid photopolymer. The liquid photopolymer is cured to form a layer of the object by exposure to actinic radiation which may be ultraviolet light. Photopolymers may be mixtures comprising acrylate functional monomers and photoinitiators.

Cured photopolymers may become brittle or warp when exposed to ultraviolet light. They may be hygroscopic and bloat in moist environments. Some cured photopolymers may contain residual toxic chemicals and therefore objects formed from these photopolymers cannot be implanted into the body of an animal or human. The range of material properties attainable using photopolymers is limited. Each layer of photopolymer may contract slightly when cured, resulting in cumulative warping and making achievable tolerances insufficient for the production of precision objects such as dental models, dental restorations, tooling patterns and filigree jewelry.

Some other processes form objects from a starter material that is a powder (such as a polymer or ceramic powder) hardened with a binder. The objects are heterogeneous and generally porous, undesirable properties for some objects. The object's physical properties are generally limited to those of the powder. The binder fills the interstices. The binder generally has less strength than the powder, so the objects generally have less strength than the powder. Powder processes generally have a low resolution of at least 0.2 mm which is unsuitable for making fine objects.

SUMMARY OF THE INVENTION

According to a first aspect of the invention, there is provided a method for making an object, the method comprising forming a plurality of sections of the object, wherein the formation of each of the plurality of sections comprises applying at least two substances within an area having the shape of the section being formed, the at least two substances being able to chemically react upon contact with each other to form the section.

The applicant has appreciated that the starting materials now used for some object fabrication techniques, including but not limited to rapid prototyping, limit or prevent the techniques' use. Some embodiments of the invention may provide a method and an apparatus that enable the use of substances hitherto unused for object fabrication. The hitherto unused substances may expand the range of materials that the made object may comprise, which may in turn increase the use of the techniques. A reaction product of the chemical reaction of the at least two substances may have at least one property that is improved with respect to a prior art starting material. At least one property of the reaction product may be engineered by altering at least one of the at least two substances, or the ratio of the substances applied, to suit the object's use. It may not be practical or possible to apply a mixture of the substances or the reaction product, but it may be practical to apply the substances separately.

In the context of this specification, an object is a tangible object. It may, for example, be rigid or resilient. It may have one or more hollows or voids, such as that of a cup or a bottle, for example. Example objects that may be made include but are not limited to jewelry, dental restorations, enclosures for handheld devices and power tools, hearing aid shells, a sculpture such as a life size reproduction of a person, and a vehicle dashboard.

In the context of this specification, a section is to be understood to encompass a slice of the object. A planar section is to be understood to encompass a portion of the object located between two parallel planes that intersect the object. Generally, but not necessarily, the sections of the object formed are planar sections.

In an embodiment, the at least two substances can chemically react to form a polymeric material.

In an embodiment, the at least two substances may be first and second polymer subunits. The first polymer subunit may be a compound that has a functional group containing active hydrogen and the second polymer subunit may be a compound that has a functional group which reacts with active hydrogen. The first polymer subunit may be a compound that has one or more functional groups independently selected from: amine, amido, carboxylic acid, hydroxyl, thiol, urethane and urea. The second polymer subunit may be a compound that has one or more functional groups independently selected from: isocyanates and epoxides.

The polymeric material may, for example, be selected from the group consisting of: polyurethanes, polyesters, acrylic polymers, polyureas, epoxys, polycyanurates, organopolysiloxanes, polyamides and co-polymers of polyurethanes, polyesters, acrylic polymers, polyureas, epoxys, polycyanurates, organopolysiloxanes and polyamides.

In an embodiment, the at least two substances may comprise at least one compound having a vinyl functional group and at least one compound which is a free radical initiator. The polymeric material may, for example, be selected from the group consisting of: acrylic polymers, vinyl-ester resin polymers and polyester resin polymers.

In an embodiment, the at least two substances may comprise at least one compound providing an aldehyde functional group which can be polymerized by an ionic catalyst and at least one ionic catalyst. The polymeric material may be polyoxymethylene. The at least one compound providing an aldehyde functional group may cross-link a further substance comprising a formaldehyde resin selected from the group consisting of: urea-formaldehyde resin, phenol-formaldehyde resin, and melamine-formaldehyde resin.

In an embodiment, the at least two substances may comprise at least one vinyl functional organosiloxane compound and at least one hydride functional organosiloxane compound. In such embodiments, in order for these compounds to react to form the section, the at least two substances also comprise a hydrosilylation catalyst.

In an embodiment, the at least two substances may comprise at least one hydroxyl functional organosiloxane compound and at least one silane compound having an alkoxy or amine functional group. In such embodiments, in order for these compounds to react to form the section, the at least two substances also comprise a silicone condensation cure catalyst. The polymeric material may, for example, be an organopolysiloxane.

In an embodiment, the at least two substances comprises at least one compound having a functional group containing active hydrogen and at least one compound having a functional group which reacts with active hydrogen.

In an embodiment, the polymeric material is a conductive polymeric material. The conductive polymeric material may be selected from the group consisting of: polypyrrole, polyaniline, poly(3,4-ethylenedioxythiophene), poly(p-phenylene sulphide), polyacetylene and poly(p-phenylenevinylene).

In an embodiment, the at least two substances chemically react to form a metallic substance. The metallic substance may comprise a metal selected from the group consisting of: silver, gold, copper, nickel, tin, cobalt, chromium, palladium and mixtures thereof. The at least two substances may, for example, comprise a first substance that is an ion of silver, gold, copper, nickel, tin, cobalt, chromium or palladium, and a second substance that is a reducing agent.

In an embodiment, the at least two substances are applied in combination with a further substance. The further substance may be mixed with one of the at least two substances before application within the area having the shape of the section being formed. The further substance may be selected from one or more of: a catalyst to catalyse the chemical reaction between the at least two substances; a phase change material for carrying one or more of the at least two substances; a colourant and a tackifier.

In an embodiment, the at least two substances are applied as a liquid.

In an embodiment, the at least two substances are applied in the form of droplets.

In an embodiment, applying the at least two substances within the area comprises projecting the at least two substances towards the area.

In an embodiment, at least one of the at least two substances changes phase after being applied.

In an embodiment, the at least two substances are applied within the area such that the substances so applied are interspersed with each other.

In an embodiment, the at least two substances are applied within the area to define a pattern in which units of the substances are adjacent to each other. The at least two substances may be applied within the area to define layers of the substances adjacent to each other. The at least two substances may be applied within the area to define lines of the substances adjacent to each other. In such embodiments, the at least two substances may not be in contact with each other, even though they have been applied to the area, and a subsequent step is required before the at least two substances make contact and chemically react with each other to form the section. For example, the substances may be melted and flow into each other.

In an embodiment, the at least two substances are smeared after being applied (e.g. in order to cause the at least two substances make contact with each other).

In an embodiment, each of the plurality of sections of the object is a layer of the object, and the layers of the object are successively overlaid.

In an embodiment, the layers are planar layers.

In an embodiment, the method comprises the step of forming a vessel arranged to contain the at least two substances within the area. In an embodiment, the vessel is formed by applying a vessel material around the perimeter of the area. The method may comprise the step of removing the applied vessel material.

In an embodiment, the melting point of the vessel material is higher than the melting point of at least one of the at least two substances.

In an embodiment, the formation of each of the plurality of sections comprises separately applying the at least two substances within the area.

In an embodiment, each of the at least two substances are applied only within the area.

In an embodiment, the at least two substances are obtained from separate sources.

In an embodiment, each of the at least two substances are moved from a respective substance outlet. The two substances may be applied such that the at least two substances come together at the area. Alternatively, the substances come together before arriving at the area.

In an embodiment, at least two different regions of the plurality of sections are formed from different proportions of the at least two substances. This may result in an object having regions with different chemical, physical or appearance properties.

According to a second aspect of the invention, there is provided an apparatus for making an object, the apparatus comprising:

an applicator arranged to apply at least two substances within an area having a shape of a section of the object being made, the at least two substances being able to chemically react upon contact with each other to form the section.

In an embodiment, the applicator has a plurality of substance outlets. Each substance outlet may be configured to be in communication with a reservoir of a respective one of the at least two substances. The applicator may have another outlet. The other outlet may be located between an outlet for one of the at least two substances and an outlet for another one of the at least two of substances. The other outlet may be in communication with a reservoir of a substance that interferes with a reaction at the applicator between the one of the at least two substances and the other one of the at least two substances.

In an embodiment, the applicator is arranged to apply a vessel material used to make a vessel arranged to contain the at least two substances within the area when so applied.

In an embodiment, the apparatus may comprise a radiation source for emitting radiation. The apparatus may be arranged to illuminate the vessel material with the radiation to cause it to harden. The apparatus may be arranged to illuminate the at least two substances when so applied with the radiation. The radiation source may be a light source and the radiation may be light.

In an embodiment, the apparatus is arranged to heat the at least two substances when so applied.

In an embodiment, the apparatus comprises a remover arranged to remove at least some of the applied at least two substances. The remover may comprise a roller. The remover may comprise an evaporator.

An embodiment of the apparatus comprises a controller. The controller may be configured to receive instructions for making the solid object. The controller may be configured to receive instructions in the form of data indicative of a plurality of sections to be formed sequentially by the device. The sections may be individually determined. Each individually determined section may differ from another of the sections by, for example, the shape of their respective boundaries. Not every section needs to be different, however. The controller may be further configured to coordinate the application of the at least two substances by the applicator such that the plurality of sections are formed sequentially in accordance with the received instructions. The controller may be configured to cause the apparatus to execute the steps of a method in accordance with the first aspect of the invention. The controller may comprise a processor.

Were possible, any one or more features of the first aspect of the invention may be combined with any one or more features of the second aspect of the invention.

According to a third aspect of the invention, there is provided a plurality of reservoirs that each contain a respective one of the at least two substances, the at least two substances are able to react with each other to form at least part of a solid object.

In an embodiment, each of the plurality of reservoirs may be configured to be in communication with an apparatus for making a solid object in accordance with the second aspect of the invention. The plurality of reservoirs may comprise another reservoir that contains a substance that interferes with the reaction.

Were possible, any one or more features of the third aspect of the invention may be combined with any one or more features of the first and second aspects of the invention.

According to a fourth aspect of the invention, there is provided a cartridge for an apparatus for making an object, the cartridge containing a plurality of reservoirs in accordance with the third aspect of the invention.

In an embodiment, the cartridge may comprise a plurality of substance outlets. Each of the substance outlets may be in communication with one of the plurality of reservoirs. The cartridge may be configured to be received by a cartridge holder of an apparatus for making a solid object.

Were possible, any one or more features of the fourth aspect of the invention may be combined with any one or more features of the first to third aspects of the invention.

According to a fifth aspect of the invention, there is provided a method for making an object, the method comprising forming a plurality of layers, each layer corresponding to a section of the object, wherein the formation of each of the plurality of layers comprises applying at least two substances within an area having the shape of the corresponding section, the at least two substances being able to chemically react upon contact with each other to form the section.

Were possible, any one or more features of the fifth aspect of the invention may be combined with any one or more features of the first to third aspects of the invention.

BRIEF DESCRIPTION OF THE FIGURES

In order to achieve a better understanding of the nature of the present invention, embodiments of the invention will be described below, by way of example only, with reference to the accompanying figures in which.

DETAILED DESCRIPTION OF THE INVENTION

Figure 1:
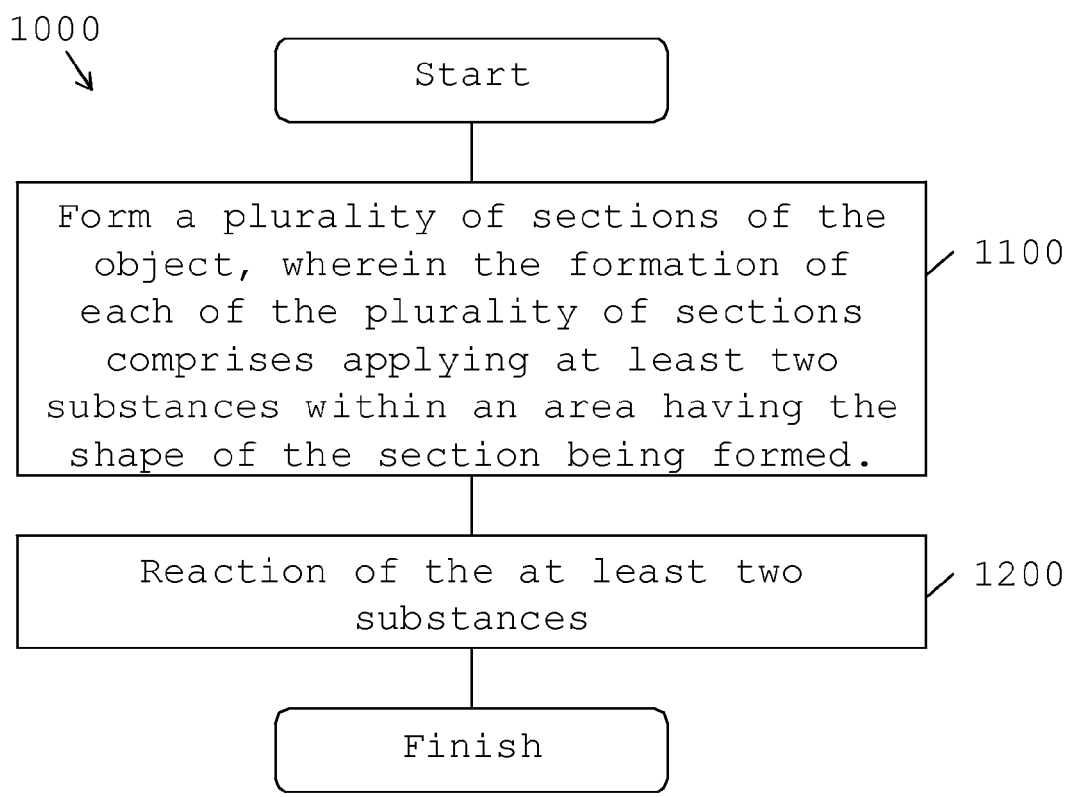
FIG. 1 shows a flow diagram of an embodiment of a method for making an object.

The first aspect of the invention provides a method for making an object. The method comprises forming a plurality of sections of the object, wherein the formation of each section comprises applying at least two substances within an area having the shape of the section being formed. The at least two substances are able to chemically react upon contact with each other to form the section.

Substances Used to Form the Sections of the Object

The at least two substances used to form each of the sections of the object may be any substances that will chemically react upon contact with each other to form a reaction product that has properties which make it suitable for use in making an object. For example, desired objects may generally be formed from sections that are solid and relatively durable. Particularly desirable properties in certain applications may include toughness, hardness, elasticity, resilience, heat stability and chemical resistance to liquids such as water, acids, alkalis and solvents.

Each of the at least two substances will typically be stable on its own (or in admixture with other compatible substances, as described below), and will only react when it comes into contact with the other (or another) of the at least two substances. Once the at least two substances come into contact (which may be before, during or after the at least two substances are applied within the area), chemical reactions commence, which ultimately result in the formation of the section. As will be described below, some substances will react immediately upon contact with each other. Thus, in some embodiments, the method of the present invention may only require two substances to be applied within an area in order to form the section. However, some substances will not react upon contact with each other, and other substances will be required in order to cause the desired chemical reactions to occur. In such embodiments, the method of the present invention may require the application of more than two substances.

Further, in some embodiments, it may be desirable to prevent the substances from chemically reacting immediately upon application within the area. In such embodiments, the at least two substances may be applied to the area in a carrier, which substantially prevents the substances from making contact with each other. The reactions to form the section are then initiated by mobilizing or driving-off the carrier.

Many kinds of substances are capable of chemically reacting with each other. For example, compounds comprising nucleophilic functional groups will typically react with compounds comprising electrophilic groups. Thus, in some embodiments, a first substance may be a compound having at least one nucleophilic functional group. Suitable nucleophilic functional groups include, but are not limited to, amino, amido, carboxylic acid, hydroxyl and thiol functional groups. Also, derivatives of such nucleophilic functional groups may be employed, provided that they can form a nucleophilic species in situ, such as acid chlorides, anhydrides, esters, carboxamides and silyl ethers. In some embodiments, the first substance may have two or more different nucleophilic functional groups.

In some embodiments, a second substance may be a compound having at least one electrophilic group which is capable of reacting with a nucleophilic group of the first substance. Suitable electrophilic functional groups include isocyanate, isothiocyanate, epoxide, carboxylic acid and carboxylic acid derivatives. Suitable carboxylic acid derivatives include acid chloride, anhydride or carboxamide functional groups. In some embodiments, the second substance may have two or more different electrophilic functional groups.

In some embodiments, the at least two substances may chemically react to form a polymeric material.

Examples of types of polymeric materials useful in the present invention include polyurethanes, epoxys, acrylic polymers, polyureas, polyamides, silicones, conductive polymers, cross-linked polyester resin systems, cross-linked urea-formaldehyde resin systems, cross-linked phenol-formaldehyde resin systems, polyoxymethylene, cross-linked melamine-formaldehyde resin systems, and polycyanurates. An example silicone (also known as polyorganosiloxanes) is polydimethylsiloxane. Example conductive polymers include polypyrroles, polyanilines, poly(3,4-ethylenedioxythiophene)s, poly(p-phenylene sulphide)s, polyacetylenes and poly(p-phenylenevinylene)s. In some embodiments the conductive polymer may also be an electrochromic polymer, i.e. when the polymer conducts electricity it also emits light. The polymeric material can be formed by either step-growth or chain growth polymerisation reactions.

In some embodiments, the polymer may be a homopolymer derived from a single kind of polymer subunit, for example, acrylic functional monomers. In some embodiments, the polymeric materials useful in the present invention may be co-polymers that are derived from two or more kinds of polymer subunits. For example, in some embodiments, the polymeric materials may be co-polymers comprising polyurethane, polyurea, epoxy, polycyanurate, organopolysiloxane and/or polyamide subunits.

In embodiments where the at least two substances chemically react to form a polymeric material, the at least two substances may comprise first and second polymer subunits. The term "polymer subunit" is used herein to refer to monomers, dimers, multimers (e.g. oligomers) and mixtures thereof that, upon polymerisation, form a polymer (e.g. the polymeric material). The dimers and multimers may be formed from monomer units which are the same or different. Consequently, the polymer subunit may itself be a homopolymer or a copolymer.

The polymer subunits may be polymerised by any process appropriate for the particular monomers involved. This encompasses addition polymerisation or condensation polymerisation, with catalysis or free radical initiation, where required, produced by redox reaction, heat or radiation.

In some embodiments, the first polymer subunit comprises compounds that have a functional group (or groups) containing active hydrogen (e.g. amine, amido, carboxylic acid, hydroxyl, thiol, urethane and urea), and the second polymer subunit comprises compounds that have a functional group (or groups) which reacts with active hydrogen (e.g. isocyanates and epoxides).

In some embodiments, the polymeric material may be formed via the reaction between at least two substances comprising only one polymer subunit. Exemplary embodiments of such reactions are described below.

In some embodiments, the at least two substances include at least one compound having at least one vinyl functional group (e.g. vinyl, allyl or acrylate), and at least one compound which is a free radical initiator (e.g. peroxide, hydroperoxide, azo or diazo) capable of cross-linking the vinyl group.

In some embodiments, the at least two substances include at least one compound providing an aldehyde functional group which can be polymerized by an ionic catalyst (e.g. multimers of formaldehyde such as 1,3,5-trioxane), and at least one ionic catalyst (e.g. boron trifluoride etherate and tert-butyl perchlorate). In some embodiments, the aldehyde functional group may cross-link a further substance, such as a phenol-formaldehyde resin, a urea-formaldehyde resin, or a melamine-formaldehyde resin.

In some embodiments, the at least two substances includes at least one vinyl functional organosiloxane compound, at least one hydride functional organosiloxane compound, and at least one compound which is a hydrosilylation catalyst.

In some embodiments, the at least two substances includes at least one hydroxyl functional organosiloxane compound, at least one alkoxy or amine functional silane compound, and at least one compound which is a silicone condensation cure catalyst.

In some embodiments, the at least two substances may chemically react to form a metallic substance. The metallic substance may, for example, comprise a metal selected from the group consisting of silver, copper, gold, nickel, tin, cobalt, chromium, palladium or mixtures thereof (e.g. an alloy). The resultant section of the object can therefore, in some embodiments, be a thin layer of silver, copper, gold, nickel, tin, cobalt, chromium or palladium.

In embodiments where the at least two substances chemically react to form a metallic substance, the at least two substances may comprise a first substance that comprises an ion of silver, gold, copper, nickel, tin, cobalt, chromium or palladium, and a second substance that comprises a reducing agent.

The first substance may, for example, be a soluble salt of any one or more of the metals listed above (e.g. a nitrate salt), provided in a solution. The second substance may, for example, be a reducing sugar (e.g. dextrose) provided in a solution.

In some embodiments, it is possible to use a mixture of substances, such that the resultant section is formed from a mixture of different materials or, alternatively, the resultant object is made from sections formed of different materials.

For convenience, the at least two substances may be in liquid form when applied. In some embodiments, it may be necessary to heat the substances above room temperature in order for them to be in liquid form. As will be appreciated, liquids are usually easier to manipulate than solids or powders and therefore more versatile. However, some embodiments of the present invention may involve the use of substances that are not entirely in liquid form when applied. For example, the substances may contain suspensions of solids or may be colloids or may be fine powders (e.g. solids or powders).

In some embodiments, the reaction product (i.e. the product formed as the result of the chemical reactions that occurred when the at least two substances came into contact) may be in a liquid or plastic form if the temperature of reaction is elevated significantly above room temperature, or initially formed in a solution. However, the reaction product in such embodiments will form a solid upon cooling or after removal of the solvent or other carrier material.

Specific examples of polymeric materials and a metallic substance from which objects can be made in accordance with the method of the present invention will now be described.

Active Hydrogen Systems

In some embodiments, the first substance is a nucleophilic compound having at least one functional group containing active hydrogen. Such functional groups include amine, amido, carboxylic acid, hydroxyl, thiol, urethane and urea. In such embodiments, the second substance is an electrophilic compound having at least one functional group which reacts with active hydrogen, such as isocyanates and epoxides.

Active hydrogen reaction systems permit the formation of polymers hitherto unavailable to rapid prototyping techniques, including polyurethanes, epoxies and polyureas. These materials may provide favourable object properties such as hardness, toughness, resilience, flexibility, foam formation, frictional properties, radiation stability, chemical resistance, heat resistance, and similarity to common engineering thermoplastics and thermoset plastics.

Some specific examples are described below.

Polyurethane

In some embodiments, the at least two substances chemically react to form a polyurethane.

For embodiments of the present invention in which the polymeric material comprises a polyurethane, the nucleophilic functional groups of the first substance may comprise hydroxyl groups, and the electrophilic functional groups of the second substance may be isocyanate groups. The first substance may possess multiple hydroxyl groups (i.e. polyols) in order to provide more opportunity for cross-linking during polymerisation. The second substance may possess multiple isocyanate functional groups (i.e. polyisocyanates) in order to provide more opportunity for cross-linking during polymerisation.

Suitable polyols include monomeric and/or polymeric compounds. Suitable monomeric polyols include glycerol, neopentyl glycol, trimethylol propane, ethyl butyl propanediol, trimethylol ethane, and pentaerythritol. Suitable polymeric polyols include polyakylene glycols; polyester polyols; acrylic polyols; and polyurethane polyols.

Suitable polyisocyanates include aliphatic, cycloaliphatic and aromatic polyisocyanates. Aliphatic polyisocyanates can be particularly advantageous as polyurethanes formed from aliphatic polyisocyanates resist yellowing on exposure to ultraviolet radiation and are less toxic to humans than aromatic polyisocyanates. Examples of aliphatic polyisocyanates include tetramethylene diisocyanate and hexamethylene diisocyanate, isophorone diisocyanate, trimethylhexamethylene diisocyanate, cyclohexane-1,4-diisocyanate, 4,4'-methylene bis(cyclohexyl isocyanate), isomeric bis(isocyanato methyl)-benzenes/toluenes, 1,4-bis(isocyanato methyl) cyclohexane, and the like. Such aliphatic polyisocyanates may be used either alone, or in a mixture with one or more of the other aliphatic polyisocyanates listed above. Suitable aromatic isocyanates include 2,2'-methylene diphenyl diisocyanate, 2,4'-methylene diphenyl diisocyanate, 4,4'-methylene diphenyl diisocyanate, 2,4-toluene diisocyanate, 2,6-toluene diisocyanate, commercial mixtures of 2,4- and 2,6-toluene diisocyanate, 4,4'-diphenylmethane diisocyanate, dianisidiene diisocyanate, the isomeric benzene, xylene and naphthalene diisocyanates. Such aromatic polyisocyanates may be used alone or in a mixture with other aromatic polyisocyanates, such as those listed above, or with the aliphatic polyisocyanates listed above.

In place of polyisocyanates, polyisothiocyanates, or compounds containing both isocyanate and isothiocyanate groups may be used. Specific examples include hexamethylene diisothiocyanate, tetramethylene diisothiocyanate, 2,4- and 2,6-toluene diisothiocyanate.

One or more urethane catalysts may be present in at least one of the at least two substances to facilitate the polyurethane reaction. Examples of suitable reaction catalysts include tertiary amines, such as triethylamine, triethylenediamine, dimethylcyclohexylamine, dimethylethanolamine, pentamethyldiethylenetriamine, N,N,N'-trimethyl-N'-hydroxyethyl-bis(aminoethyl)ether, N'-(3-(dimethylamino)propyl)-N,N-dimethyl-1,3-propanediamine, hexahydro-N, N'-dimethyl aniline, tribenzylamine, N-methyl-piperidine, N,N'-dimethylpiperazine; alkali or alkaline earth metal hydroxides; heavy metal ions, such as iron (III), manganese (III), vanadium (V) or metal salts such as lead oleate, lead-2-ethylhexanoate, zinc (II)octanoate, lead and cobalt napththenate, cobalt benzoate, zinc (II)-ethylhexanoate, dibutyltin dilaurate, dibutyltin diacetate, stannous octoate, bismuth octanoate, lithium acetate, and also bismuth, antimony and arsenic compounds, for example bismuth tris-neodecanoate, tributyl arsenic, triethylstilbene oxide or phenyldichlorostilbene.

Polyepoxide

In some embodiments, the at least two substances chemically react to form a polyepoxide (also known as an epoxy). In such embodiments, the nucleophilic functional groups of the first substance may, for example, be hydroxyl, amino or thiol functional groups. The first substance may possess at least two hydroxyl (polyol), amino (polyamines) or thiol (polythiol) functional groups. The electrophilic functional groups of the second substance is/are epoxide functional groups. The second substance may have at least two epoxide functional groups (i.e. a polyepoxide).

The second substance (i.e. that containing one or more epoxide functional groups) can be monomeric or polymeric, saturated or unsaturated, aliphatic, cycloaliphatic, aromatic or polyaromatic and may be substituted or unsubstituted if desired. Suitable substituents include, but are not limited to epoxide groups, hydroxyl groups, ether linkages, aromatic groups, halogen substituted aromatic groups and the like. Suitable polyepoxides include those of epihalohydrins, glycidyl ethers which are prepared by epoxidizing the corresponding allyl ethers using methods well known to those skilled in the art. The epoxide derivatives of methylene bisphenol or isopropylidene bisphenol are suitable, as is epichlorohydrin.

In some embodiments, the first substance is a polyamine having at least two primary amino functional groups. Example of those amines which can be utilized are aliphatic polyamines such as diethylenetriamine, triethylenetetramine, tetraethylenepentamine, diproprenediamine and the like; alicyclic polyamines such as menthane diamine, isophoronediamine and the like; and aromatic amines, such as the alkylene-linked polyphenyl amines and phenylene diamines such as metaphenylene diamine, diaminodiphenylmethane, and diaminodiphenylsulfone.

In some embodiments, the first substance is a polyol. Suitable polyols include aromatic or aliphatic polyols. Suitable aromatic polyols include isopropylidene bisphenol (bisphenol A), novolac, resorcinol, hydroquinone, substituted hydroquinones, for example, methylhydroquinone, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'- dihydroxydiphenylditolylmethane, 4,4'-dihydroxydiphenyl-tolylmethylmethane and the like. The aromatic polyol may be bisphenol A. Suitable aliphatic polyols include ethylene glycol, propylene glycols, butylene glycols, pentane diols, bis-(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, for example, polyethylene glycols, polypropyleneglycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, alcohol partial esters, such as monostearin, pentaerythritol monoacetate and the like, and halogenated polyols such as the monochlorohydrins of glycerol, sorbitol, pentaerythritol and the like.

In some embodiments, the first substance is an acid anhydride. Example acid anhydrides include phthalic, trimellitic, hexahydrophthalic and methylnadic anhydride.

In some embodiments, the first substance is a polycarboxylic acid.

In some embodiments, the first and second substances may react rapidly upon contact to form a polyepoxide. This may happen, for example, when the first substance is a tertiary amine such as triethylenetetramine. In some embodiments it may be advantageous to include with the at least two substances an epoxy catalyst to facilitate the reaction between the at least two substances, such as, for example when the first substance comprises a hydroxyl functional compound. Such catalysts include tertiary amines, amine salts, boron trifluoride complexes, and amine borates. Specific examples include benzyl dimethylamine, boron trifluoride monoethylamine and dimethyl aminomethyl phenol.

Polyurea

For embodiments of the present invention in which the polymeric material comprises polyurea, the nucleophilic functional groups of the first substance may be amine groups (the first substance may be a polyamine), and the electrophilic functional groups of the second substance may be isocyanate groups (the second substance may be a poly isocyanate). The reaction product of a polyamine and polyisocyanate is referred to as a polyurea. Polyurea substances typically exhibit greater flexibility than polyurethane polymers.

Examples of suitable polyamines are provided above in relation to the formation of epoxy polymers. Examples of suitable polyisocyanates are provided above in relation to the formation of polyurethane polymers. The polyamine and polyisocyanate compounds may respectively be mixed with suitable carriers, tackifiers, viscosity modifiers, antioxidants etc., as described below. As the amine-isocyanate reaction is auto-catalytic, it may not be necessary to add a catalyst to either of the substances.

Vinyl Cross-Linked Systems

In an embodiment, a first substance is at least one compound containing vinyl functional groups. The vinyl may be a part of a larger functional group such as allyl or acrylate. A second substance is at least one compound which is a free radical initiator, such as a peroxide, hydroperoxide, azo and diazo capable of cross-linking the vinyl groups in the first substance.

Examples of polymers produced by vinyl cross-linking include acrylic polymers, vinyl-ester resin polymers (whereby the unsaturated double carbon bonds of a polyester resin are cross-linked with the vinyl groups of co-mixed acrylate functional resins), and polyester resin polymers (whereby the unsaturated double carbon bonds of a polyester resin are cross-linked with the vinyl groups of co-mixed styrene monomer).

For embodiments of the present invention in which the polymeric material comprises an acrylic polymer, the first and second substances react upon contact to form the acrylic polymer.

Some acrylic polymers have the advantageous property of being non-toxic and may be used in contact with the skin, in the mouth, or are implantable. In this respect, it is particularly advantageous that the present invention does not require the addition of photoinitiators, which are often used in alternative processes, and are often toxic.

In such embodiments, the first substance may, for example, be a compound with acrylate (acryloyl) functional groups, and the second substance may be a curing agent (e.g. a free-radical curing agent), such as benzoyl peroxide or dichlorobenzoyl peroxide.

Compounds with acryloyl functional groups include acrylic acid, methylacrylate, phenylacrylate, dimethylacylate, benzylacrylate, methylacrylic acid, dimethylacrylic acid, phenylacrylic acid, ethyl acrylate, 2-chloroethyl vinyl ether, 2-ethylhexyl acrylate, hydroxyethyl methacrylate, butyl acrylate, butyl methacrylate, TMPTA, and the like.

Suitable acrylate substances are supplied by Sartomer (Exton, Pa.), and include acrylic monomers with trade names CD590, SR833s, SR531 and SR399, as well as acrylic oligomers with trade names CN2283, CN9030, CN822, and CN2920. Of these, CD590 and CN2283 are examples of a monomer and oligomer that have relatively low viscosities, making them suitable for formulating acrylate compositions capable of being projected by a substance projector.

Example free radical curing agents include, for example, methylethylketone peroxide, cumene hydroperoxide, t-butyl perbenzoate, and 1,1-di-(t-butylperoxy)-3,3,5-trimethylcyclohexane, or solutions thereof.

Silicone Systems

In some embodiments, the at least two substances chemically react to form a polysiloxane (also known as a silicone). Silicones may exhibit high flexibility, good chemical stability, and non-toxicity to humans.

Addition Cured Silicones

To produce an addition cured silicone object, the first substance may contain at least one silicone compound having vinyl functional groups. Suitable compounds include, for example, di-vinyl terminated polyorganosiloxanes having the structure:

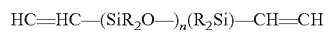

and poly-vinyl side-chain polyorganosiloxanes having a structure such as:

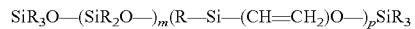

where R is an aliphatic, aromatic, cycloaliphatic, heterocyclic, heteroaromatic or polyaromatic substituent, each R can be the same or different, integers m, n and p indicate the repetition multiple of the bracketed group and can independently be any integer between 0 and 100.

The second substance may contain at least one hydride functional siloxane compound, such as a hydride terminated polyorganohydrosiloxane having the structure:

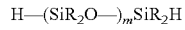

or a hydride side-chain polyorganohydrosiloxane having the structure:

where R is an aliphatic, aromatic, cycloaliphatic, heterocyclic, heteroaromatic or polyaromatic substituent, each R can be the same or different, and integers m and n indicate the repetition multiple of the bracketed group and can independently be any integer between 0 and 100.

In some embodiments, a hydrosilylation catalyst may be applied with either or both of the first and second substances. The catalyst may be applied with the first substance containing the vinyl silicone. Hydrosilylation catalysts may be organometallic compounds which are soluble in the silicone resin and include platinum complexes containing vinyl-siloxane ligands and rhodium complexes. An example of such a catalyst is Karstedt's catalyst, formed by the reaction of divinyltetramethyldisiloxane with chloroplatinic acid. Other hydrosilylation catalysts include cis-dichlorobis(diethyl sulfide)platinum (II) and the reaction product of dimethyldivinylsilane and chloroplatinic acid. The hydrosilylation addition cure catalyst may be applied in concentrations of typically 5 to 100 parts per million with the first substance, though concentrations outside of this range may also be effective.

In some embodiments, inhibitors such as dimethyl fumarate and dimethyl maleate may be added to either or both of the substances to slow the rate of reaction.

Vinyl functional siloxane compounds may also be mixed with the second substance containing hydride functional siloxane compounds (provided there is no hydrosilylation catalyst present in the second substance) so that approximately equal volumes of the first and second substances result in stoichiometric ratios of the reactive vinyl-siloxane and hydride-siloxane groups.

Addition cure silicone chemistry may be advantageous as it typically produces no volatile by-products, which may result in shrinkage of the object. Other vinyl terminated organic monomers or oligomers may be included in the substances which become incorporated into the product via the hydrosilylation reaction with hydride-siloxane functional groups. Any suitable vinyl terminated compound can be used.

Condensation Cured Silicones

In some embodiments, a silicone polymer may be produced by a condensation cure reaction mechanism, in which a first substance may be a hydroxyl functional organosiloxane compound, such as one having the structure:

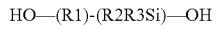

HO—(R1)-(R2R3Si)—OH where R1, R2 and R3 are aliphatic, aromatic, cycloaliphatic, heterocyclic, heteroaromatic or polyaromatic substituents, which may be the same or different, or may be polyorganosiloxanes which may further incorporate functional hydroxyl groups.

An example substance containing a polysilanol functional compound is hydroxy endblocked polydimethylsiloxane.

The second substance in such embodiments may be a polyfunctional alkoxy or amine silane compound having, for example, the following structure:

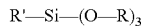

R'—Si—(O—R)$_3$ where R and R' are aliphatic, aromatic, cycloaliphatic, heterocyclic, heteroaromatic or polyaromatic substituents, which may be the same or different.

An example second substance in such embodiments is tetrapropoxysilane.

In such embodiments, a suitable tin or zinc organometallic catalyst is typically applied with one of the substances, for example the first substance, which contains the polysilanol.

Free-Radical Cured Silicone

In some embodiments, the silicone can be produced by a free-radical cure reaction mechanism. In this embodiment, one of the substances applied to the area may be a polyvinyl functional siloxane compound, examples of which are provide above, and the other substance may be a free-radical generator such as benzoyl peroxide or dichlorobenzoyl peroxide.

Aldehyde Systems

In an embodiment, the first substance is a compound providing an aldehyde functional group, such as formaldehyde, materials which can produce an aldehyde functional group after a ring-opening process such as 1,3,5 trioxane, and materials which decompose to produce an aldehyde functional group such as hexamethylenetetramine; and the second substance is an ionic catalyst which can polymerize the first substance. The first substance may polymerize with itself, such as in the ring-opening polymerization of trioxane as described below, or it may cross-link a further substance, such as a phenol-formaldehyde resin, urea-formaldehyde resin or melamine-formaldehyde resin.

For example, polyoxymethylene may be produced by the ring opening polymerization of 1,3,5-trioxane and a cationic catalyst. In this embodiment, the first substance applied to the area is 1,3,5-trioxane, produced, for example, by the trimerization of formalin; and the second substance is, for example, tert-butyl perchlorate. The polymerization may be performed at around 80 degrees Celsius where the 1,3,5-trioxane is in a liquid state. Ring opening of 1,3,5 trioxane results in decomposition into formaldehyde monomers and a methylenic carbocation. Liberated formaldehyde rapidly polymerizes to form polyoxymethylene, a tough polymer with good friction and wear properties.

Metals

In other embodiments, the at least two substances chemically react upon contact to form a metallic substance (e.g. a metal). Such embodiments may advantageously be able to incorporate reflective surfaces or electrically conductive pathways into the fabricated object. For example, an electrically insulating polymeric material, such as a polyurethane or epoxy polymer, may be formed by applying a suitable reactive pair of substances, such as those described above, and an electrically conductive metallic conductor pattern may be formed in the object by applying another suitable reactive pair of substances. In this way, a densely integrated electrical device may be formed using the method of the present invention.

In one embodiment, the metallic substance is silver. In such an embodiment, the first substance may be silver nitrate, and may be provided in the form of a solution of silver nitrate, ammonia and potassium hydroxide, and the second substance is a reducing solution containing, for example, a reducing sugar such as dextrose. Other suitable reductants include aldehydes, such as formaldehyde or benzaldehyde.

Once the first and second substances are applied to the area, the substances can mix which causes silver metal ions to be reduced to the metallic state and silver to be deposited onto the substrate within the area having the shape of the section being formed.

In another embodiment, the first substance is provided in the form of a solution containing nickel ions (e.g. an aqueous solution of nickel sulfate) and the second substance is provided in the form of a reducing solution containing aqueous sodium hypophosphite. Upon mixing, nickel metal ions are reduced and nickel is deposited in the area.

Other metals, including gold, palladium, chromium, tin, cobalt and copper, can be deposited in a similar manner.

In some embodiments, excess liquid may remain after deposition of the metallic substance. In such embodiments, excess solution may be removed using a remover (described below), and further moisture or solvent may be evaporated, for example, using radiant heat and/or a fan, prior to application of the next layer of material.

Conductive Polymers

In some embodiments, the substances when applied to the area react upon contact with each other to form a conductive polymer. The conductive polymer may also be an electrochromic polymer.

One example of a conductive electrochromic polymer is polyaniline hydrochloride. Polyaniline hydrochloride is a known conductive polymer having conductivity in the order of 1 S/cm. It is also a known electrochromic material, that is, with suitable doping it may emit light when current is passed through it. Polyaniline hydrochloride may be formed from a first substance that is an acidic aqueous solution of aniline, such as aniline hydrochloride, and a second complimentary substance that is an aqueous solution of ammonium peroxydisulfate.

When mixed at room temperature, in some examples in stoichiometric proportions, aniline hydrochloride and ammonium peroxydisulfate react to form solid polyaniline hydrochloride. After a layer of the reactive solutions is deposited and allowed to react, excess solution may then be removed with a remover, and further moisture or solvent may be evaporated, for example, using radiant heat and/or a fan, prior to application of the next layer of materials.

Polyaniline hydrochloride, and similarly other forms of protonated polyaniline, permit the incorporation of "plastic" electrodes into the object, electrochromic devices, and tailor-made composite systems. For example, objects with electronic circuits and light emitting displays may be fabricated using the method of the present invention. As polyaniline is relatively insoluble in most known solvents it has proven a challenge to incorporate into practical devices. By forming the polyanaline in-situ, the present invention provides a practical means for incorporating conductive and electrochromic polyaniline into arbitrary shaped objects.

Further Substances Applied within the Area the Shape of the Section

As discussed above, the at least two substances applied within the area the shape of the section comprise substances which are capable of reacting to form a solid reaction product (i.e. the section of the object) upon contact with each other.

In some embodiments, the at least two substances have physical properties that enable them to be applied to the area and chemical properties that enable them to react on contact. In such embodiments, it is only necessary to apply the first and second substances within the area in order for the substances to come into contact and cause the chemical reactions which form the section to commence. In some embodiments, it may be advantageous to apply heat or radiation (e.g. UV light) to increase the rate of the reaction in order to form the section more rapidly.

However, in some embodiments, the at least two substances will not react upon contact and it is necessary to apply (before, after or at the same time) a further substance or substances with the at least two substances in order to cause the first and second substances to react with each other.

Such a further substance could, for example, be combined with and applied with either one of the first and second substances or, alternatively, applied separately. Examples of such further substances include one or more reactive species, such as additional reactants and/or catalysts.

As will be appreciated, in some embodiments, a catalyst will be required in order to cause the first and second substances to react in order to form the section. To facilitate the reaction, such reaction catalysts may be applied with the first, the second or both substances, or applied separately. In the case of application of reaction catalyst with both substances, the catalyst or catalysts applied with the first substance may be the same or different from the catalyst or catalysts applied with the second substance. Alternatively, the catalyst may be applied via a separate applicator.

It is within the skill of a person skilled in the art to determine an appropriate catalyst (if, indeed one is required) for any given combination of substances. Examples of suitable reaction catalysts are discussed above in the context of the specific examples of the at least two substances.

In some embodiments, the further substance may be a tackifier which improves adhesion between the sections of the object. For example, the tackifier may include compounds such as a glycerol ester of hydrogenated abietic acid, natural gum rosins, rosin esters, phenol modified rosin resin and polyterpenes. In some embodiments, the further substance may be a viscosity modifier, surfactant, light stabilizer, antioxidant, coulourant or the like.

In some embodiments the first and/or second substance may need to be mixed with a carrier in order for it to be applied to the area. Suitable carriers include fluids into which the first and/or second substance is dissolved or dispersed. In some embodiments, the carrier may be in solid form at ambient temperature, but become liquid at temperatures at which the applicator operates, generally but not necessarily from 50 to 150° C. A solid carrier permits reactive compounds which may be liquid at ambient temperature to be bound in a mixture which is solid at ambient temperature, thus preventing them from flowing away from where they are deposited. An appropriate carrier may also act as a solid solvent, permitting substances which have melting-points higher than the operating temperature of the applicator to be dissolved in the carrier and melted at a lower temperature and applied in liquid form.

Examples of phase-change carriers include paraffins, microcrystalline waxes, polyethylene waxes, ester waxes, carbamate waxes, fatty acids, fatty alcohols, fatty amides (usually a mono-amide wax and a tetra-amide resin), sulfonamides, polyamide resins, natural or mineral derived resins (e.g. tall oil resins and resin esters) and various synthetic resins. Examples of phase change carriers suitable for use with siloxane resins include dimethicone copolyol (polyether substituted dimethicone), laurylmethicone copolyol, cetyl dimethicone copolyol and stearyl dimethicone copolyol.

In some embodiments, the method may comprise the step of forming a vessel arranged to contain the at least two substances within the area the shape of the section after application, especially in embodiments where the substances are liquid at ambient temperature, or where it is necessary to raise the temperature of the substances above their melting point after their application to facilitate a chemical reaction. In some embodiments, the vessel is formed by applying a vessel material around the perimeter of the area when forming each of the sections.

After the object is formed, the applied vessel material can be removed, for example by melting (e.g. if the vessel material is a wax or the like), dissolving (e.g. if the vessel material is soluble in a particular solvent), peeling, etc.

Application of the Substances

In the method of the present invention, the at least two substances are applied within the area in such a way as to allow sufficient contact between the substances to enable the formation of the solid reaction product within the area (i.e. the formation of the section of the object). Any application method which results in the applied substances being able to react to form the section is acceptable.

In some embodiments, the at least two substances may be applied within the area such that they immediately make contact with each other and commence reacting with each other in order to form the section. In other embodiments, the at least two substances may be applied within the area such that they do not make contact with each other, but require a further step to occur before they make contact with each other and commence reacting with each other in order to form the section. For example, one or more of the at least two substances may be carried in a carrier (e.g. a wax) which prevents the substances from making physical contact until the carrier is removed or mobilized (e.g. by melting the wax). Alternatively, the at least two substances may be applied in a manner whereby they are physically discrete from each other (e.g. in a droplet form), and do not react until the discrete substances are somehow mixed (e.g. by smearing or ultrasound, etc).

In some embodiments, the at least two substances may be applied within the area such that the substances are interspersed with each other. For example, the at least two substances may be applied within the area to define a pattern in which discrete units of the substances are adjacent to each other, to define layers of the substances adjacent to each other or to define lines of the substances adjacent to each other. In other embodiments, the substances may be interspersed without forming a pattern.

In some embodiments, the at least two substances are smeared together after application within the area to further mix the substances.

The first and second (and third etc) substances may be applied within the area using any technique. In some embodiments, for example, the at least two substances may be applied in the form of droplets. Alternatively, the at least two substances may be applied in the form of streams or extrusions.

In some embodiments, the at least two substances may be projected at the area during application. Projection may be achieved using a substance projector, as described further below.

The at least two substances are obtained from separate sources before being applied within the area. In this manner, the substances are only able to make contact and begin to react when applied to the area. For example, the substances may be obtained from separate reservoirs of a cartridge, as described further below. The two or more substances may be combined immediately before, during or after application to the area.

The amounts and proportions of the at least two substances applied to the area will depend on the nature of the substances and the chemical reactions that occur in forming the section. Such parameters can be determined by a person skilled in the art. In embodiments where the substances comprise nucleophilic and electrophilic functional groups, the substances may be applied such that the nucleophilic and electrophilic functional groups are in an approximately equal ratio, that is, in stoichiometric proportions. In other embodiments, the substances may be applied in non-equivalent ratios. For example the first substance can be applied with a relative molar ratio of 1:10, 1:5, 1:3, 1:2, 2:1, 3:1, 5:1 or 10:1 in relation to the second substance. These variations in molar ratio can be achieved by either varying the amount of fabrication material applied by the applicator or by varying the concentration of compound present in the fabrication material.

Formation of the Object

The object may be made by joining the sections of the object formed by the methods discussed above. In some embodiments, the sections are layers of an object, and the object is made by forming successive overlaid layers. The layers may, for example, be planar layers. Alternatively, the layers may be cylindrically shaped. Generally, the layers may have any suitable geometry.

Generally but not necessarily, an object that is desired to be formed is split up into many imaginary sections (e.g. layers). The object is then "built up" by successively forming the sections on top of one another. The first section is formed on a substrate, with subsequent sections being formed on the previously formed sections.

Each of the sections may be joined using an adhesive or, alternatively, the chemical reactions between the first and second substances that result in the forming of the section also result in the joining of the section being formed to the previous section.

FIG. 1 shows a flow diagram of an embodiment of a method for making the object, the flow diagram generally being indicated by the numeral 1000. A first step 1100 comprises forming a plurality of sections of the object, wherein the formation of each of the plurality of sections comprises applying at least two substances obtained from separate sources within an area having the shape of the section being formed. The second step 1200 comprises allowing the at least two substances to react in order to form the section.

Embodiments of an Apparatus

Figure 2:
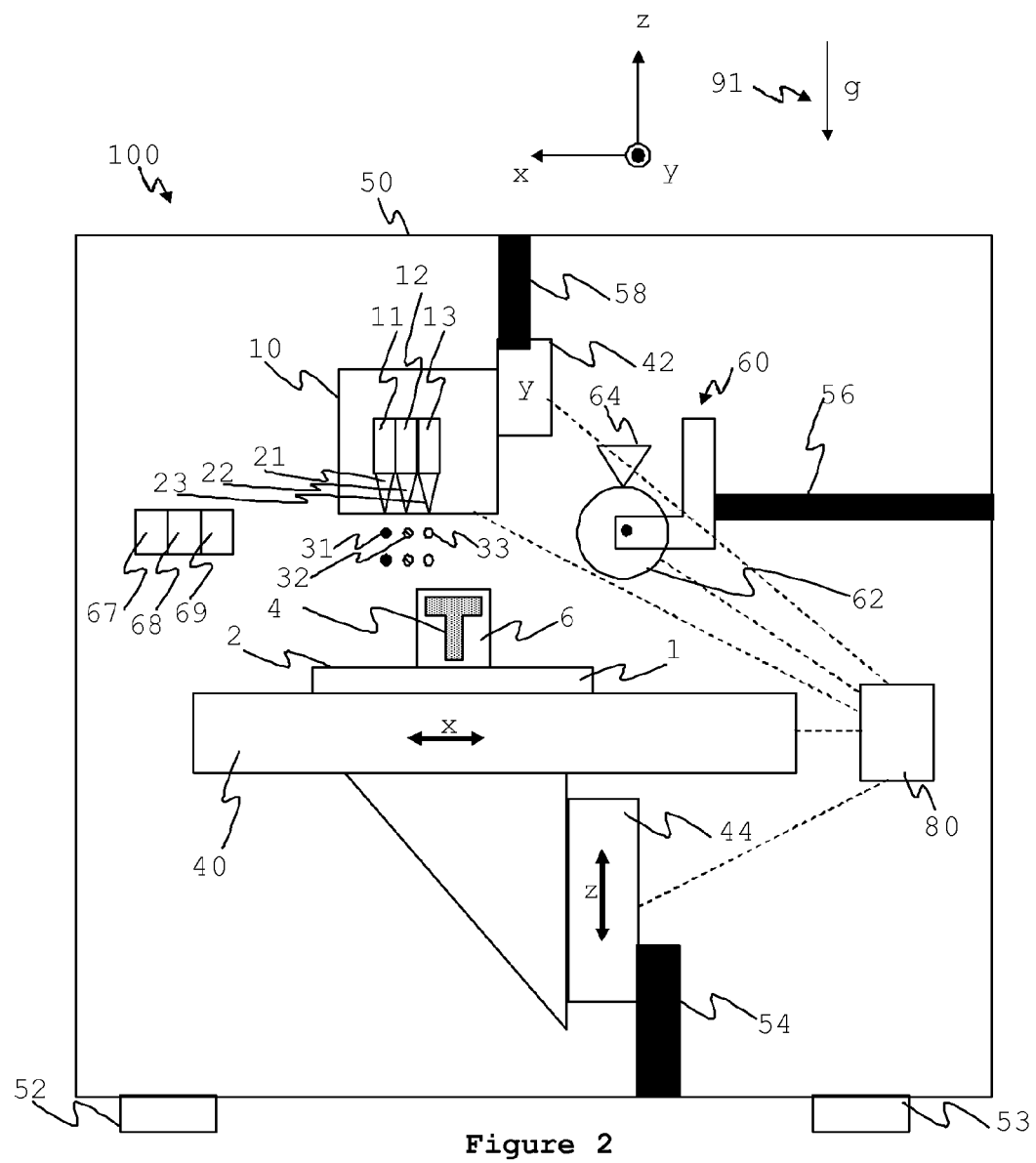
FIG. 2 shows a schematic elevation view of an embodiment of an apparatus for making an object.

FIG. 2 shows a schematic elevation view of an embodiment of an apparatus for making an object, the apparatus being generally indicated by the numeral 100. Coordinate axis x, y and z are shown in FIG. 2, with the z axis defining the vertical.

The apparatus 100 comprises an applicator 10 configured to apply substances 31,32 and vessel material 33 over a surface 2 of a fabrication platform 1. In this embodiment, the substances come together at the area to which they are applied. In some other embodiment, however, the substances come together before arriving (that is, in mid-flight) at the area to which they are applied. The applicator 10 has multiple outlets for substances and vessel material in the form of separate nozzles 21,22,23. In this embodiment, the applicator is in the form of a replaceable cartridge that is received by a cartridge holder of the apparatus. In other embodiments, the applicator may have several cartridges. In this disclosure "applicator" generally refers to any suitable means for applying substances, and may constitute a plurality of discrete application units. For example, the applicator may have several application units that are independently translatable.

In the embodiment of FIG. 2, the substances 31,32 and vessel material 33 may be stored in separate reservoirs 11,12, 13, respectively. In this, but not all embodiments, the cartridge incorporates the reservoirs. The cartridge may be replaced when its reservoir is depleted of substance or vessel material. Alternatively, the depleted reservoir may be recharged with the substance or vessel material. In embodiments having multiple cartridges, the substances or vessel material may be divided between the multiple cartridges.

In alternative embodiments, the reservoirs are separated from the applicator and connected thereto by substance conduits in the form of hoses, tubes or pipes. The reservoirs may be disposed within a housing of the apparatus.

In this embodiment, substances 31 and 32 are individually stable. The chemically reactive mixture is formed when the substances are mixed. The object 4 when completed comprises the reaction product of substances 31 and 32. The reaction may take place predominantly in the apparatus itself during the application process, or it may take place predominantly after the application process is completed but still within the proximity of the apparatus, or it may take place after the application process has been completed and the applied substances have been removed from the apparatus. In the present embodiment, the fabrication substances are solid at ambient temperature and are applied at an elevated temperature at which they are liquid. The cartridge incorporates a heater in the form of a resistive heating element to heat the substances. The substances consequently maintain their shape and position after being applied because they freeze to a solid. In the context of this specification, a solid substance means one which maintains its shape without substantial flowing. Thus "solid" may encompass glassy materials, colloids of solids in a liquid or vice-versa including but not limited to sols or gels or thixotropic fluids.

The reaction product of the substances may be a material with different chemical and/or physical properties to either of substances 31 and 32 or mixtures thereof. For example, substances 31 and 32 may contain monomers and the reaction product may be a polymer. Examples of suitable substance systems are provided above.

Vessel material 33 is a material which, in the present embodiment, is applied as a liquid and is solidifiable after application and may be removed from the object after the fabrication process is completed. The liquid vessel material may solidify by freezing; suitable vessel materials include but are not limited to paraffin wax, carnauba wax, or generally any suitable thermoplastic material. The liquid vessel material may solidify by the application of energy such as light; suitable vessel materials include but are not limited to a mixture of acrylate monomer and a suitable photoinitiator. The apparatus 100 may have a light 67 for solidifying the liquid vessel material and/or initiating the reaction of the substances). The liquid vessel material may solidify by the evaporation of a solvent carrier; suitable vessel materials include but are not limited to a resin, such as shellac dissolved in a solvent such as ethanol.

The vessel material may serve at least two functions. Firstly, it forms a shell 6 around the object which allows further post-processing of the object after it has been formed, as described below. Secondly, it can be selectively applied as a scaffold material to support overhanging features of the object being fabricated. Overhanging features may not be fabricated otherwise.

The surface 2 is a surface of platform 1 which is coupled to an actuated mechanical stage 40 for moving the platform in the x-direction. Actuated mechanical stage 40 is in turn coupled to actuated mechanical stage 44 for moving both mechanical stage 40 and the platform 1 in the z-direction. The applicator 10 is coupled to actuated mechanical stage 42 for moving it in the y-direction. This arrangement allows the applicator 10 and the surface 2 to be displaced relative to each other in the x, y and z directions during the application process. The actuation may be achieved by actuators that may comprise any one or more of linear motors, drive belts, stepper motors, rack and pinion arrangements, for example, or generally any suitable components arranged to provide motion that is linear or otherwise.

The fabrication process may begin by positioning the applicator 10 a predetermined distance in the z-direction from the surface 2. The applicator applies a layer comprising at least one of the substances 31,32 over the surface while mechanical stages 40 and 42 reposition the surface relative to the applicator so that the substances can be deposited over different locations of the surface. The area of deposition corresponds to a cross-section through the object being fabricated. Vessel material 33 may also be applied around the perimeter of the area. The applicator is then set to a second predetermined distance from the surface 2 by z-axis actuator 44 in preparation for the further application of substances and vessel material. At each predetermined position, a layer of at least one of the fabrication substances 31,32 is applied over the surface in a shape corresponding to a sequential planar section through the object being fabricated, and vessel material 33 is applied around its perimeter. Each layer may be configured independently, and thus may be different from another layer, so that a solid object of arbitrary shape may be fabricated.

There may be 100 to 1,000,000 predetermined applicator positions in a typical device, but the number may fall outside of this range. The minimum separation between predetermined positions may be determined by the characteristics of the actuator causing the displacement. In the case of a stepping motor, for example, the separation between adjacent positions may be a multiple of the minimum step size that the motor is capable of. The separation may be set by software, or a combination of software and hardware factors. The separation of the first and second predetermined positions is generally equal to the thickness of a layer of the deposited substances. The layer thickness may be in the range of 1 micron to 5 mm, for example, but is generally around 0.01 to 0.1 mm for an object of the order of 10 cm in size.

Figure 3:
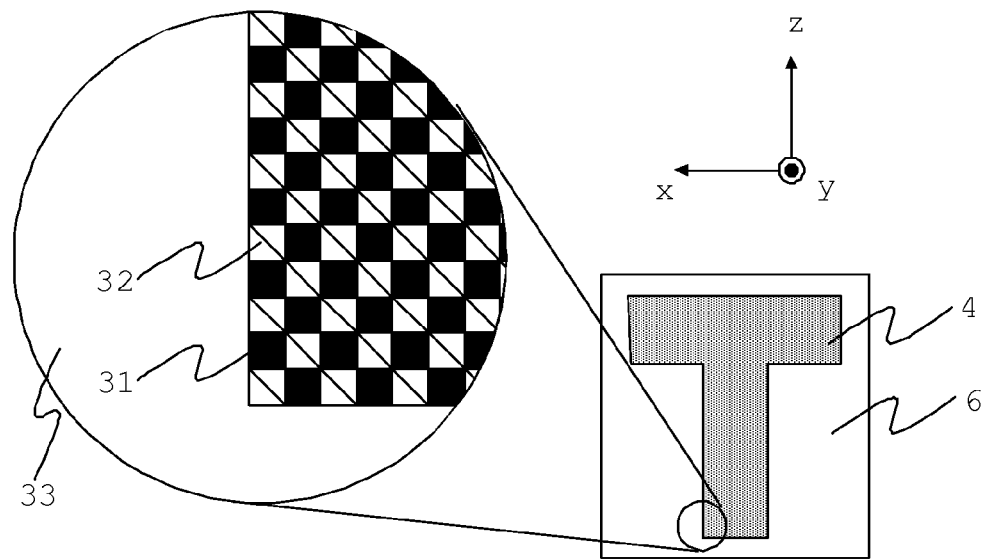
FIGS. 3 and 4 show schematic views of substances that have been applied in example configurations by the apparatus of FIG. 1.
Figure 4:
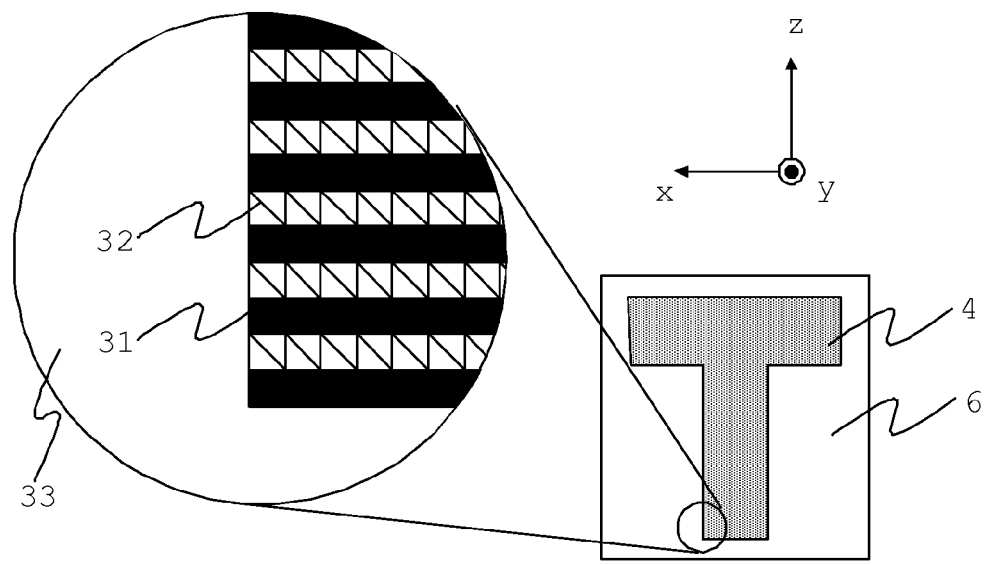

Substances 31 and 32 are applied in such a way so as to be interspersed with each other to enable the reactive compounds contained within them to mix and react. There may be a relatively large contacting surface area between the substances 31 and 32 per unit volume. FIG. 3 shows a magnified schematic view of one example in which substances 31 and 32 are applied in an alternating grid (or checker-board) pattern within each layer resulting in their relative interspersion. FIG. 4 shows another example whereby substances 31 and 32 are applied in alternating layers resulting in their interspersion. The substances may be randomly interspersed. Generally any suitable means of interspersing the substances may be used.

Interspersion of substances 31 and 32 increases the contacting surface area between them. This may enhance mixing of the reactive compounds by, for example, diffusion.

The substances may be applied in units (e.g. globules, strips or layers) of sufficiently small size to promote diffusion between the reactive components so that the reaction between them can reach a practical state of completion in a reasonable amount of time. A practical state of completion may, for example in the case of a polymer reaction, be that the reaction product is sufficiently polymerized to withstand handling without breaking; or alternatively or additionally, that the reactive compounds in 31 and 32, which may be toxic in their unreacted state, are sufficiently reacted to allow them to be touched safely by a person without harming their skin. A reasonable amount of time may be from a few seconds to a few weeks. A reasonable amount of time may be from a few minutes to a few days. A reasonable amount of time may be one hour to one day.

Excess substances applied by the applicator 10 over the surface 2 can be removed with a remover, such as a levelling device 60. Levelling device 60 may comprise a cylindrical milling blade which rotates around an axis substantially in the x-y plane. The levelling device may rotate at high speed and be located in an extraction enclosure to evacuate removed substances. The levelling device 60 may alternatively be a heated cylindrical roller 62 which rotates around an axis substantially parallel to the x-y plane. Melted substance which adheres to the surface of the heated roller is subsequently removed from it with a scraping blade 64. The purpose of levelling each deposited layer is to ensure that the applied layer has the prescribed thickness, otherwise subsequent layers may not be applied in their correct position from the surface 2 resulting in a fabricated object that does not match the desired shape and/or tolerances. The action of a roller levelling device may provide further beneficial effect by mixing the substances 31 and 32 due to localized smearing.

In another embodiment, the remover may include devices to evaporate any solvents contained in the applied substances. For example, in some embodiments, the remover apparatus may include a fan 68 or heater 69 directed at the applied substances and vessel material with the purpose of evaporating any volatile solvents contained in the substances or vessel material. This may be beneficial if, for example, the substances comprise aqueous or other solutions containing solutes which may be reduced and/or precipitated by the reaction. In such cases it may be desirable to both remove any excess fluid (for example with a roller-type remover as described above) and remove by evaporation any remaining solvent prior to the application of the next layer, which may otherwise, for example, not adhere well to a moist layer.

Figure 5:
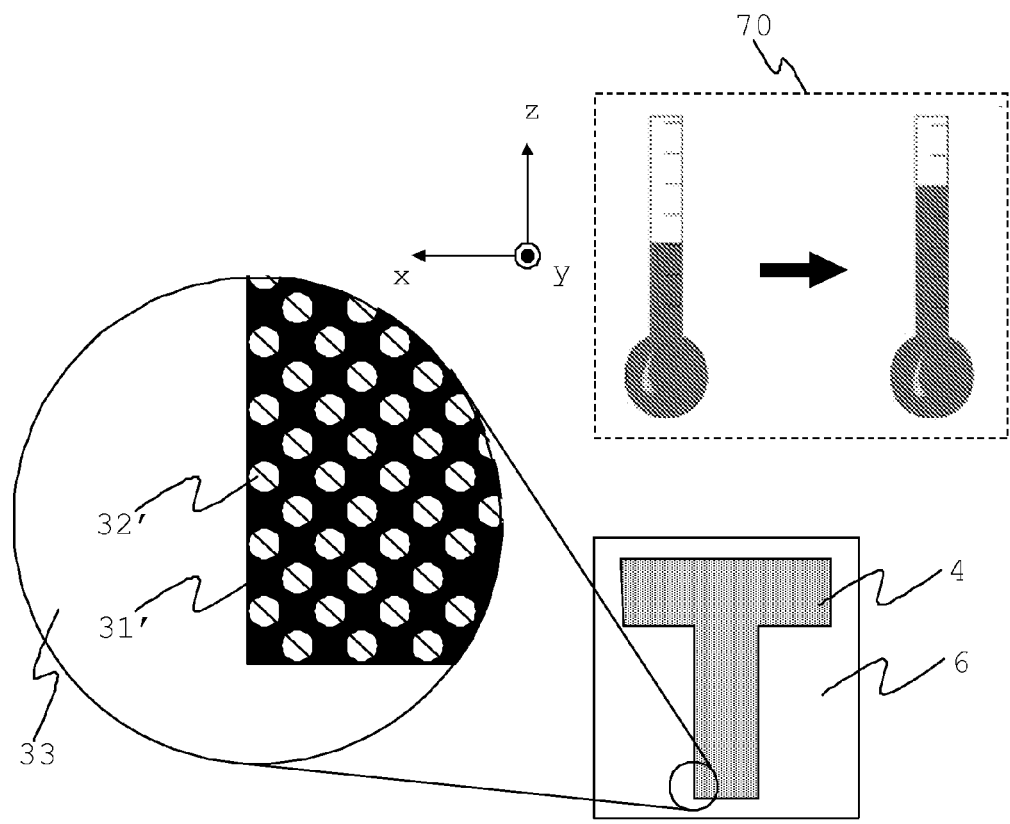
FIG. 5 shows a schematic view of substances that have been applied by the apparatus of FIG. 1 in which the temperature of deposited substances is raised above ambient temperature.

After all layers comprising the object have been applied over the surface 2, the substances 31 and 32 may be interspersed and configured in the shape of the object 4 and encapsulated in a solid shell 6 of vessel material 33. At this time, the substances may not have fully reacted with each other to produce the final material of the object. This may be because the reaction may proceed slowly at ambient temperatures, particularly when the substances are in the solid state in which mixing by diffusion is relatively slow. Then, the reaction may be assisted by raising the temperature of the substances above the melting point of at least one of the substances 31 and 32, causing at least some of the mixture to melt. This may be done by raising the temperature of at least part of the apparatus adjacent the object with a heater such as a resistive heating element incorporated therein (for example, the heating element may be incorporated in the fabrication platform). Alternatively, the object may be removed from the apparatus and placed in, for example, an oven or a heated fluid bath. In this embodiment, the vessel material 33 remains solid at the raised temperature. This situation is depicted in FIG. 5, which shows a magnified schematic view of a section of the applied substances at the raised temperature 70 in which substances 31 and 32 are melted and in a fluid state as indicated by the prime symbol ('). This may allow reactive compounds in substances 31 and 32 to mix by diffusion more readily than when in the solid state. The higher temperature may also accelerate the reaction between the fabrication compounds. In some cases it may be beneficial to heat the object in a fluid bath, as the buoyancy provided by the fluid may place less forces on the object, thereby preventing it from deforming. In the absence of the solid shell 6 of vessel material, the object 4 may become soft and deform or flow away. The solid shell 6 may further provide an oxygen impermeable barrier preventing oxygen from contacting the substances. This may prevent oxidation or discoloration of the reaction product, or prevent other undesirable reactions.

In alternative embodiments, the reaction between substances is rapid and it may not be necessary to raise the temperature to promote the reaction between them.

Figure 6:
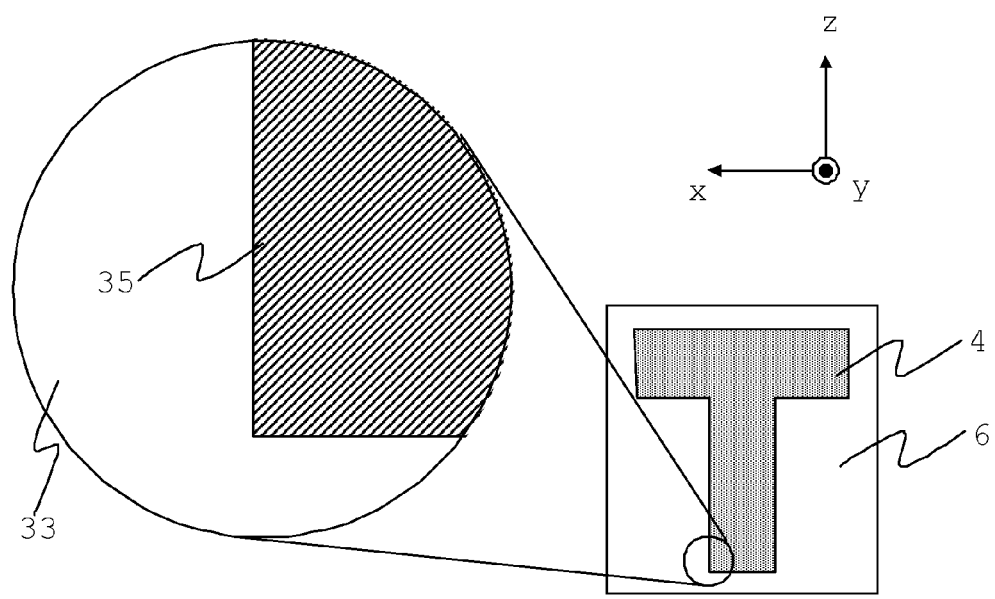
FIG. 6 shows an example of a reaction product of substances that have been applied by the apparatus of FIG. 1.

Once the substances 31,32 have sufficiently reacted to produce object material 35, as shown in FIG. 6, the vessel material 33 of shell 6 may be removed from the object 4. This may be achieved by chemical or physical means by virtue of its different properties compared to the object material. For example, in one embodiment, the vessel material may be mechanically peeled or broken away from the surface of the object. In another embodiment, for example when the vessel material is paraffin wax, the temperature of the vessel material may be raised above its melting point (but below the melting point of the object material 35) and thereby melted away. In still another embodiment, for example when the vessel material is a wax such as but not limited to paraffin wax, the object encased in vessel material may be placed in a solvent such as turpentine which dissolves the vessel material but not the object material.

In some embodiments the vessel material may comprise only a relatively thin layer around the object. In such cases it may be unnecessary to remove the vessel material.

Multiple Object Materials

In some embodiments, it is desirable to apply more than two at least two substances, or vary the applied ratios of the at least two substances, such that the resultant section is formed from the reaction between several substances or, alternatively, the resultant object is made from sections or regions of sections formed from different materials.

Figure 7:
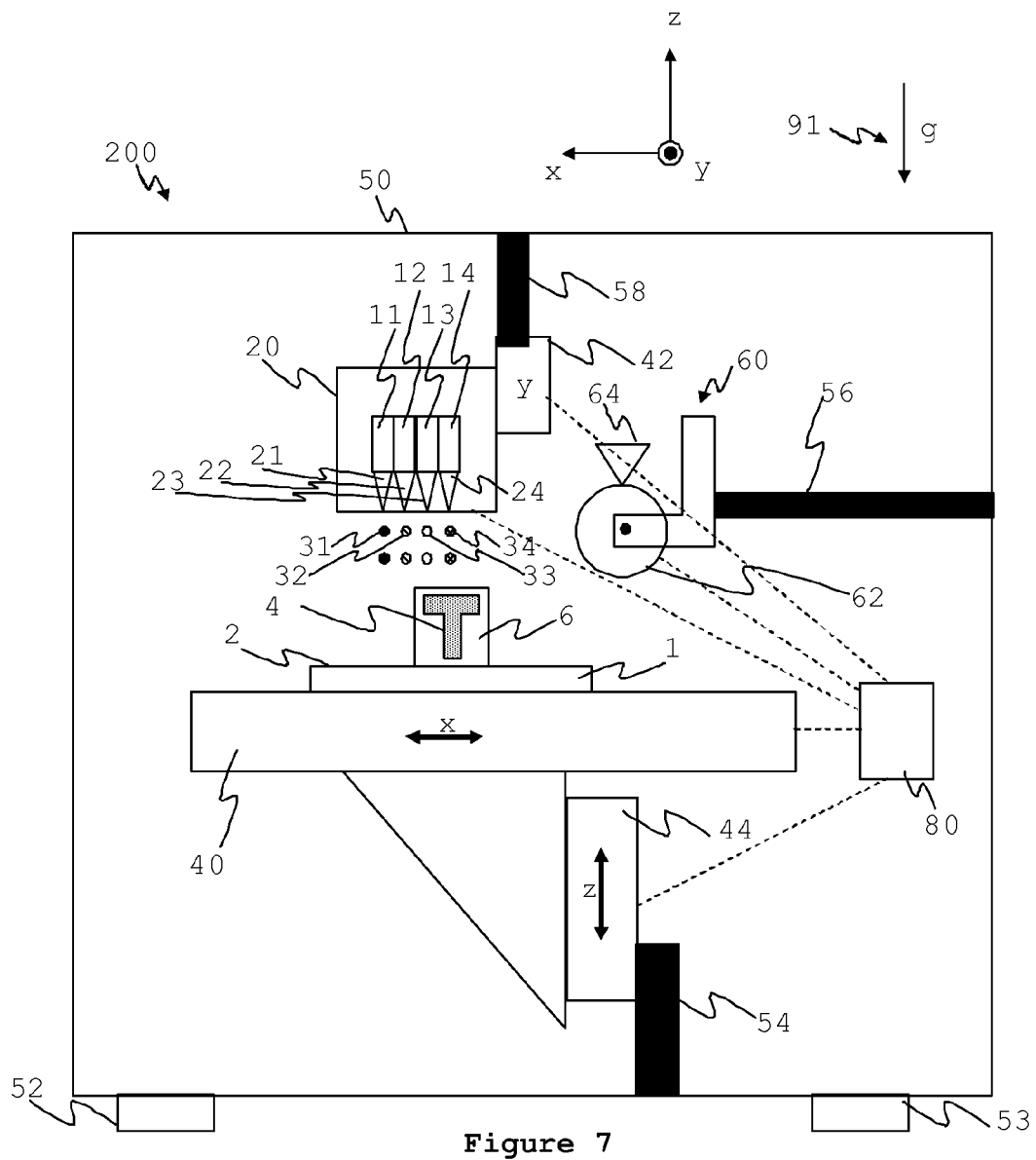
FIGS. 7 to 10 each show a schematic elevation views of a respective embodiment of an apparatus for making an object.

For example, FIG. 7 shows an apparatus incorporating an additional substance 34 delivered via separate nozzle 24 and reservoir 14. Substances 31 and 34 together may form a different reaction product than substances 31 and 32 together. The properties of the different reaction products may be varied in a programmable manner by varying the proportions of substances 31, 32 and 34 at each location within each area.

In another example, to produce a car rear-view mirror, it may be desirable to fabricate the frame from layers of a plastic material such as a polyurethane, and apply substances to produce a reflective material such as metallic silver in the mirror section. This may involve the selective application of two polyurethane-forming-substances and a further two silver-forming-substances within appropriate regions of the sections. Examples of such substance sets are provided above.

In another example, a shaving razor handle having a soft grip may be fabricated by forming the handle's core from layers of a stiff plastic material such as an epoxy polymer, and forming the handle's skin from layers of a resilient material such as polydimethylsiloxane. This may be achieved by the selective application of two epoxy forming substances and a further two silicone forming substances within appropriate regions of the sections. Examples of such substance sets are provided above.

In another example, a prosthetic leg having a soft tough cup for receiving a stump and a stiff tip for ground contact may incorporate a gradient of material properties in between the cup and tip. It may be fabricated from three polyurethane precursor substances. A polyisocyanate first substance may form a soft polyurethane polymer with a polyol second substance, and the same polyisocyanate first substance may form a hard polyurethane polymer with a polyol third substance. By applying an appropriate ratio of the second and third substance polyols with the first substance polyisocyanate, a programmable gradient in hardness may be achievable in the prosthetic leg. Examples of polyurethane producing substances are provided above.

In another example, several different substances may include different colourants so that objects with different colours, colour mixtures or colour gradients can be produced. This may be achieved by combining suitable dyes or pigments with the substances.

Different Geometries

Figure 8:
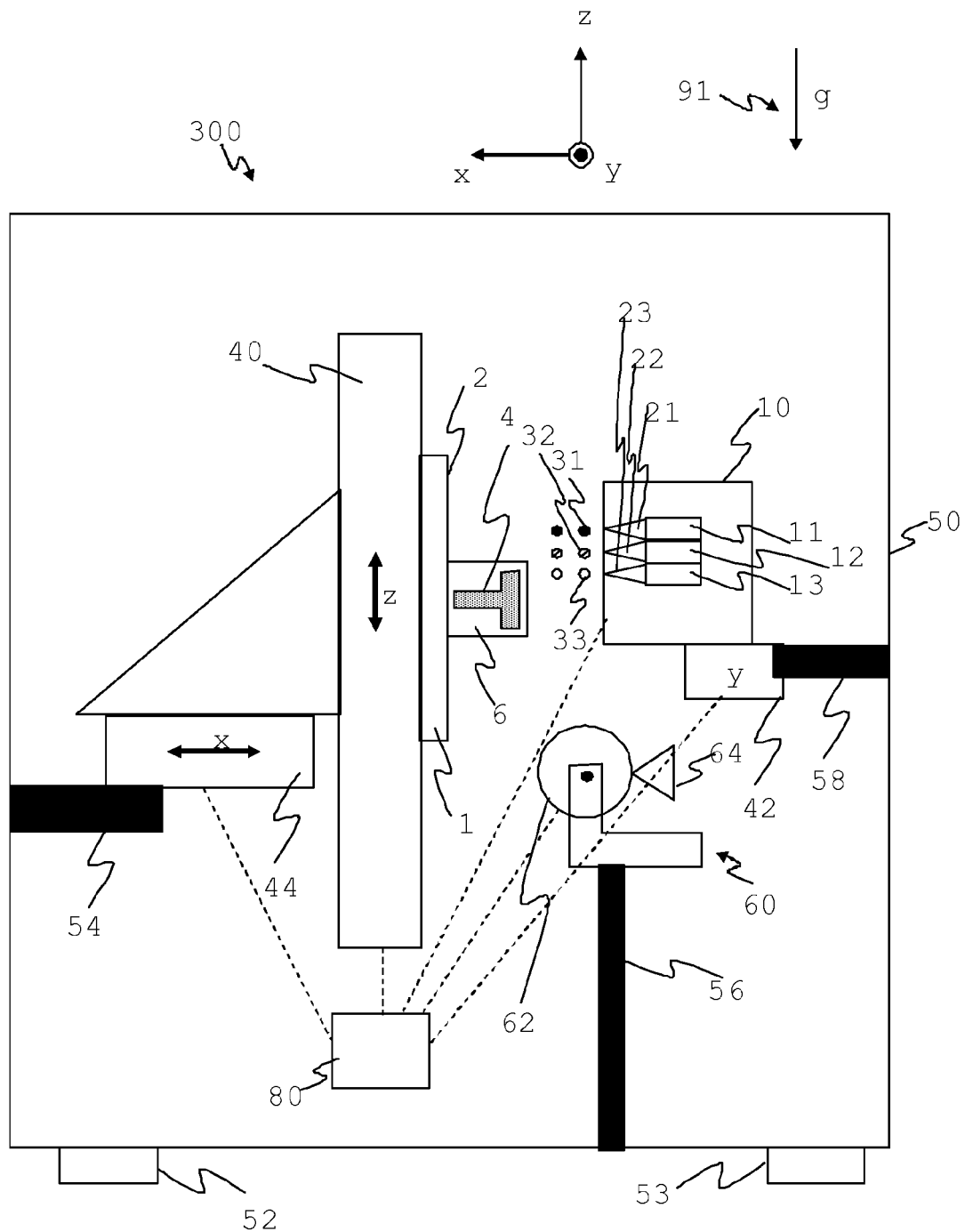
Figure 9:
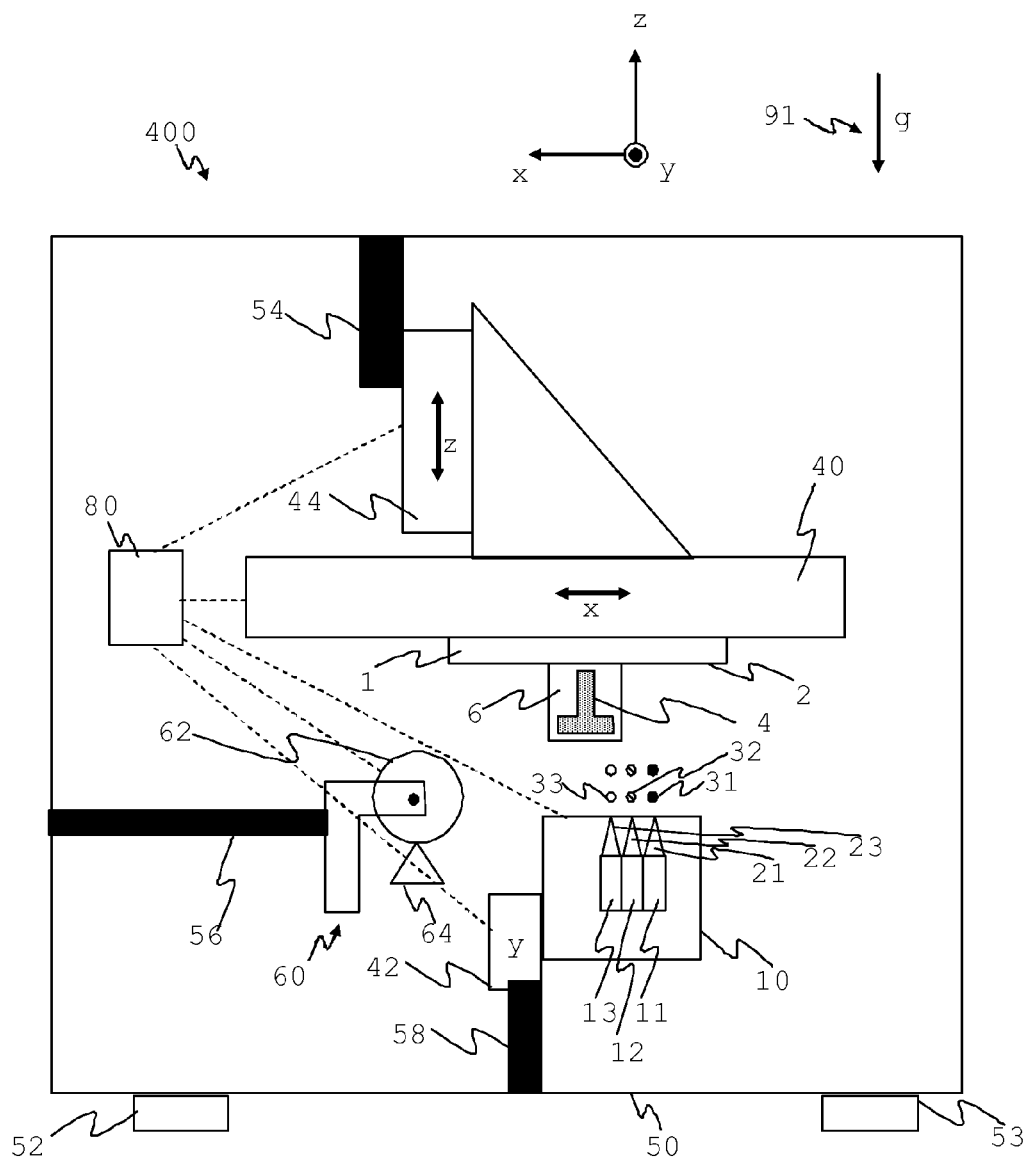
Figure 10:
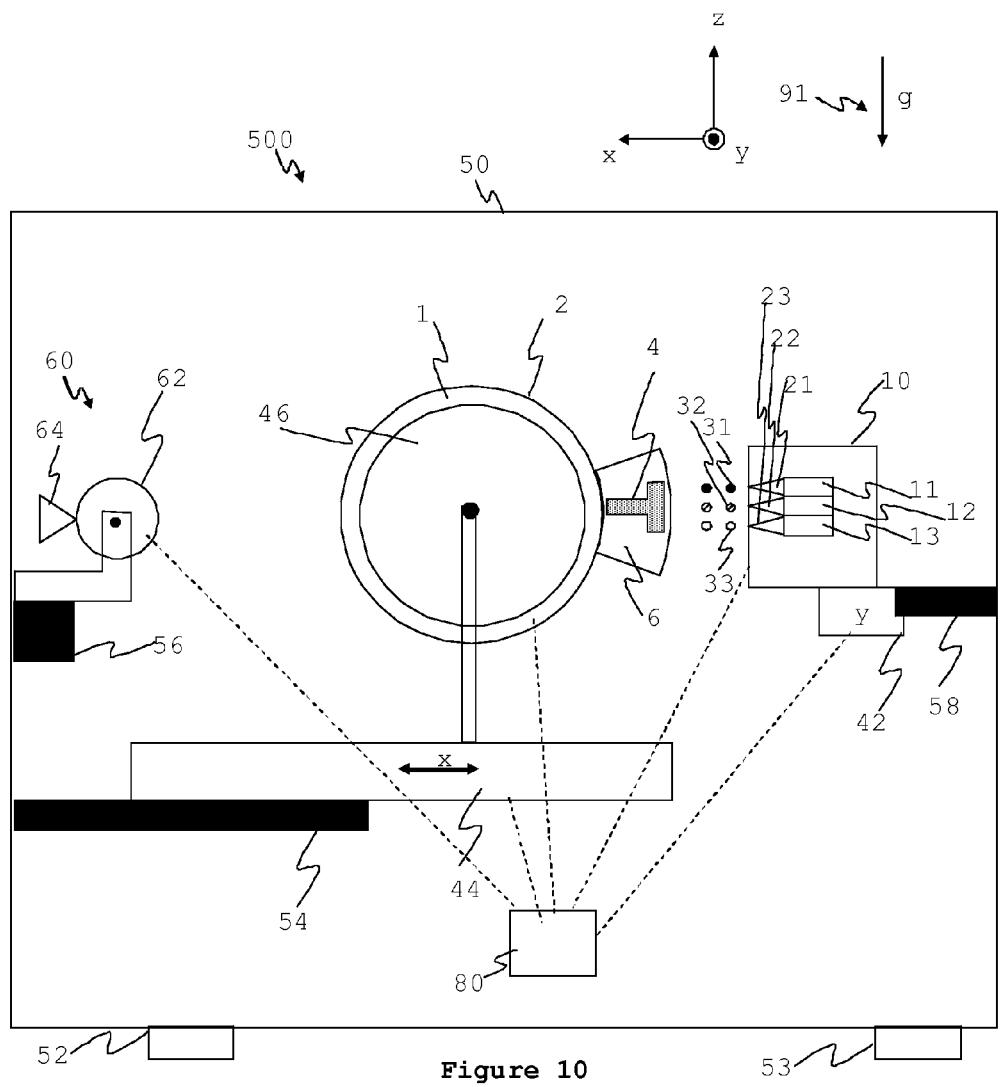

The embodiment of FIG. 2 is configured such that in use the platform 1 is horizontally orientated, that is, the force of gravity is in the negative-z direction as indicated by the numeral 91. The apparatus may, for example, have a chassis 50 with attached feet 52,53 configured to support the chassis above a surface such as a bench, and the platform is mounted relative to the chassis so that when the chassis is so supported the platform has a horizontal orientation. Mounting brackets 54,56,58 ensure that apparatus components are maintained in their correct position and orientation relative to the chassis. In other embodiments the platform may be vertically oriented as shown in FIG. 8 where the force of gravity 92 is in the negative-x direction. In further embodiments the platform may be downwardly oriented as shown in FIG. 9 where the force of gravity 93 is in the positive-z direction. In yet other embodiments, the platform may be a cylinder which rotates as the materials are applied, as shown in FIG. 10.

In general, it is not important whether the applicator or the surface is moved, thus all combinations of movement of the applicator and surface in any of the x, y and z directions may generally be feasible.

Controller

Figure 11:
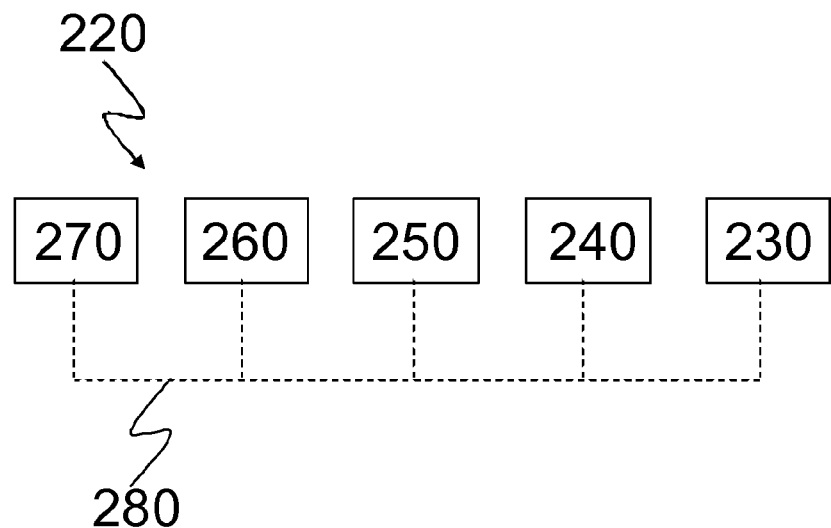
FIG. 11 shows an example of an architecture of a controller for controlling an apparatus for making an object.

In some embodiments of an apparatus, such as those in FIGS. 2, 7, 8, 9 and 10, the applicator 10, the actuators 40,42,44, the shaper 60, the light, the heater, and other operable parts of the apparatus may be in communication with and may be controlled by a controller 80 to coordinate the apparatus to make the object. These and other components may be connected by wires, cables, wireless, or any other suitable means. In this embodiment, the controller may have a processor 220, an example architecture of which is illustrated in FIG. 11. The processor unit 220 may include a suitable logic device 250 examples of which include but are not limited to an INTEL PENTIUM or a suitably configured field programmable gate array (FPGA), generic array logic device, complex programmable logic device, or other programmable logic device. The logic unit may be connected over a bus 280 to a random access memory 240 of around 100 Mb and a non-volatile memory such as a hard disk drive 260 or solid state non-volatile memory having a capacity of around 1 Gb. The processor has input/output interfaces 270 such as a universal serial bus and a possible human machine interface 230 e.g. mouse, keyboard, display etc. Device components may be controlled using commercially available machine-to-machine interfaces such as LABVIEW software together with associated hardware recommended by the commercial interface provider installed on the processor unit 220, over USB or RS-232 or TCP/IP links, for example. Alternatively, custom driver software may be written for improved performance together with custom printed circuit boards. Alternatively, the processor 160 may comprise an embedded system. The processor may be hardware, rather than a combination of hardware and software.

In this embodiment, the controller 80 is in communication with another processor which is adapted for determining instructions and/or information for the apparatus. In alternative embodiments, the processors are the same processor. An example of the other processing unit comprises a logic device such as, or similar to, an INTEL PENTIUM, ARM processor, or a suitably configured field programmable gate array (FPGA), connected over a bus to a random access memory of around 100 Mb and a non-volatile memory of such as a hard disk drive or solid state non-volatile memory having a capacity of around 1 Gb. Generally, the configuration may be similar or identical to that shown in FIG. 11. The processor has a receiver such as a USB port (or Internet connection, for example) for receiving information representing a solid object, stored on a USB FLASH device, for example. The information may be encoded in a file generated by a Computer Aided Design (CAD) program, the information specifying the geometry of the object. The logic device runs a decomposer program implementing an algorithm that decomposes (or transforms) the information into data indicative of a plurality of sections to be formed sequentially by the device. The program may have been installed onto the processor from tangible media such as a DVD or USB memory stick, for example, that stored the program. In an alternative embodiment, the decomposer may be a dedicated hardware unit. A series of sections through the object are determined. The sections may then be further processed to represent the geometry of each section as vectors or a rasterised bitmap. The sections or vectors or bit maps may be then used to control the device.

The Applicator

One example of an applicator that may be used has high-pressure pumps that direct the substances from a reservoir through a chamber and an outlet in the form of a microscopic nozzle, creating a continuous stream of ink droplets via the Plateau-Rayleigh instability. A piezoelectric crystal creates an acoustic wave as it vibrates within the chamber and causes the stream of liquid to break into droplets at regular intervals—64,000 to 165,000 droplets per second may be achieved. The ink droplets are subjected to an electrostatic field created by a charged electrode as they form; the field varies according to the degree of drop deflection desired. This results in a controlled, variable electrostatic charge on each droplet. Charged droplets are separated by one or more uncharged "guard droplets" to minimize electrostatic repulsion between neighbouring droplets.

The charged droplets pass through an electrostatic field and are directed (deflected) by electrostatic deflection plates, or allowed to continue on with being deflected to a collection gutter for re-use. The more highly charged droplets are deflected to a greater degree. Only a small fraction of the droplets may be used to print, the majority being recycled.

High droplet velocity (~50 m/s) may be achieved which allows for a relatively long distance between applicator and the point of application. A high drop ejection frequency may be achieved allowing for fast application.

Another example of an applicator that may be used has a chamber containing a heater. To eject a droplet of substance from the chamber, a pulse of current is passed through the heating element causing a rapid vaporisation at least some of the substance in the chamber to form a bubble, which causes a large pressure increase, propelling a droplet of substance out of an outlet in the form of a nozzle.

Yet another example of an applicator uses a piezoelectric material in a substance filled chamber. When a voltage is applied, the piezoelectric material changes shape, which generates a pressure pulse in the fluid forcing a droplet of ink from an outlet in the form of a nozzle.

Projectors may place constraints on the allowable viscosity of the materials applied with them, typically requiring the viscosity to be in the range of 1 to 50 centipoise at the working temperature.

In other embodiments, the applicator comprises extruding nozzles. Extruding nozzles allow material which has been melted or otherwise fluidized to be forced through them under pressure. Extruding nozzles place less restriction on the allowable viscosity of materials applied with them, permitting fluids with viscosities up to 250,000 centipoise and above.

Generally any suitable projector technology may be used, including but not limited to those that apply small droplets (generally, but not limited to a volume of less than 0.01 ml) of substance. Small droplet size enables different substances to be applied in intimate contact with each other.

Figure 12:
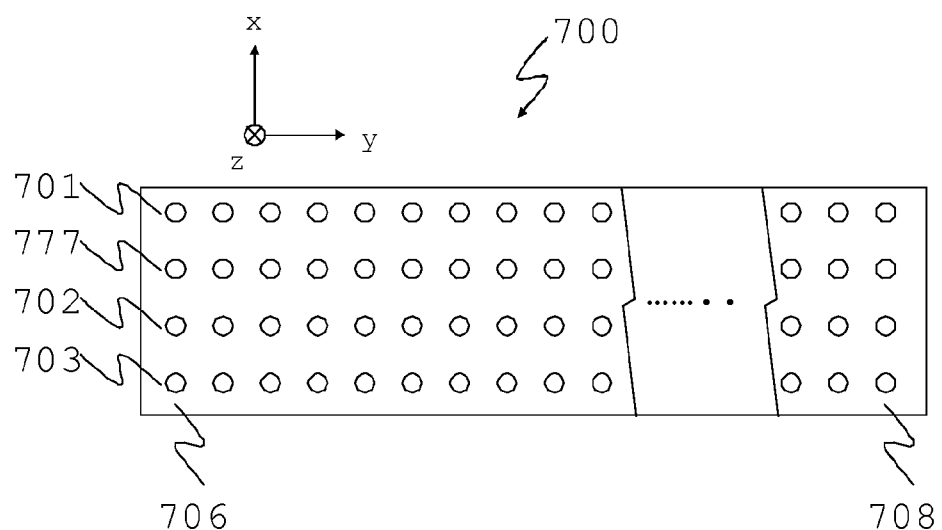
FIG. 12 shows a bottom view of an example of an applicator of an apparatus for making an object, the applicator having a plurality of substance outlets.

In some embodiments, the applicator may comprise an array of outlets, such as the nozzle array shown in FIG. 12 generally indicated by the numeral 700. The coordinate system shown in the figure indicates usage orientation consistent with the apparatus shown in FIG. 2. Nozzles are arrayed in rows 701,777,702,703 and columns 706 through to 708. For example, nozzles of row 701 and 702 may be used to apply fabrication materials 31 and 32 respectively, and nozzles of row 703 may be used to apply vessel material 33.

The applicator may be configured to apply substances for the production of at least two reaction products incorporated in the object. For example, the applicator may have outlets for substances for the production of at least two of a polyurethane, a polyepoxide, a silicone, an acrylic polymer, a polyurea, a metallic substance, and a conductive polymer.

Nozzle Protection

In some embodiments, especially where the substance outlets, are located in close proximity, such as in the nozzle array 700 shown in FIG. 12, problems may arise if the reactive fabrication substances come into contact with each other at the outlets. This may foul the outlets with reacted material. This may occur especially when the outlets are primed, purged or wiped prior to commencing fabrication. Some embodiments involve applying the substances at an elevated temperature, in which case the reaction speed may be fast and therefore present little time for cleaning and removal of any mixed fabrication substances from the nozzles. A solution to this problem is to deliver a substance that interferes with the reaction. For example, an interfering substance may be selectively expelled from nozzles disposed between the fabrication substance nozzles. The interfering substance may form a physical barrier between the reactive substances during material purges, for example, preventing reactive materials from coming into contact proximal to the nozzles. Example interfering substances include but are not limited to air, ethanol, or an inert fluid such as silicone oil. The substance that interferes with the reaction may additionally or alternatively chemically inhibit reactions between the fabrication substances. This may be achieved by deactivating or consuming reactive functional groups or catalysts in either of the fabrication substances. For example, where the fabrication substances comprise a polyisocyanate and a polyol, the interfering may be a low molecular weight alcohol, such as 1-propanol, whose single hydroxyl group terminally reacts with isocyanate functional groups and prevents further reaction. Similarly, when one of the fabrication substances contains a catalyst, the interfering substance may comprise a catalyst poison or inhibitor. For example, when one fabrication substance comprises polyvinyl siloxane groups and a platinum silicone catalyst, and a second fabrication substance contains hydrosiloxane functional groups, the interfering substance may include a platinum catalyst poison, for example compounds containing nitrogen such as amines and amides such as ethanolamine, N-methylethanolamine, triethanolamine, N,N-dimethyl ethanolamine, n-butylamine, diethylamine, triethylamine, tetramethylenediamine, cyclohexylamine, melamine, dimethylformamide, nitriles, cyanates, oximo, nitroso, hydrazo, azo compounds, adiponitrile, 2-butoxime, alpha-nitroso-beta-naphthol, EDTA (ethylenediaminetetraacetic acid), NTA (nitriloacetic acid); compounds containing sulfur such as sulfides and thio compounds such as dibenzyldisulfide, thioacetic acid and allylthiourea; compounds containing phosphorus such as phosphines for example triphenylphosphine and phosphites for example triethylphosphite; compounds containing arsenic, antimony, selenium and tellurium, such as arsines, stibenes, selenide and telluride for example triphenylarsine, triphenylstibene and P-chlorophenylcarboxymethylselenide; alcohols such as ethanol and methanol and esters such as ethyl acetate and vinyl acetate.

In the embodiment shown in FIG. 12 where nozzle rows 701 and 702 dispense reactive substance, nozzle row 777 may dispense an interfering substance which inhibits any reaction between the fabrication substances. As the fabrication substances can only mix at the applicator surface by transiting past the nozzles of row 777, they are prevented from mixing without also including some of the interfering substance. In the present embodiment the interfering substance is used only for purging, it is not applied over the surface with the fabrication substances and vessel material. In an alternative embodiment, the vessel material may act as the interfering substance.

It will be appreciated that some embodiments of the invention may have some of the following advantages:

Objects may be fabricated from a broad range of chemical systems, including polyurethane polymers, silicones and metals, which may open up a very broad range of material properties to fabrication techniques such as rapid prototyping.

Reactions forming the object may be performed after all of the sections of the object have been applied. This may prevent or reduce distortion of the object which may occur when each section of the object is cured immediately after its application.

Utilizing a suitable vessel material allows unreacted applied substances to be raised above their melting point to facilitate reactions without them deforming or flowing away.

Mixing substances during the application process rather than prior to application prevents polymerization reactions from occurring at the applicator. This may prevent blockages of the outlets and may remove the necessity of flushing the outlets with, for example, a solvent.

Utilizing an interfering substance permits integrated applicators with closely spaced nozzles of multiple materials to be used without fouling the nozzles; and Electronic or electrical components may be fabricated.

It will be appreciated that numerous variations and/or modifications may be made to the specific embodiments of the invention described herein without departing from the spirit or scope of the invention as broadly defined. The embodiments described herein are therefore to be considered in all respects as illustrative and not restrictive. For example, embodiments of the apparatus may use a screen printing process. The apparatus may comprise an assembly line having multiple screen printing stations, each screen printing station applying at least one of the at least two substances to the object being made which is progressed by the assembly line. Alternatively, the substances may be applied in a powder form, and then the applied substances heated to cause the powders to react, possibly after melting or subliming. Generally, the apparatus and method may have any suitable configuration.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that any prior art referred to herein does not constitute an admission that the prior art forms part of the common general knowledge in the art, in Australia or any other country.

The invention claimed is:

1. A method for making an object, the method comprising the steps of:
    forming a plurality of sections of the object, wherein the formation of each of the plurality of sections comprises applying at least two substances within an area having the shape of the section being formed, the at least two substances being able to chemically react upon contact with each other to form the section; and
    forming a vessel arranged to contain the at least two substances within the area;
    wherein the at least two substances comprise at least one vinyl functional organosiloxane compound and at least one hydride functional organosiloxane compound and at least one hydrosilylation catalyst compound.

2. A method defined by claim 1 wherein the vessel is formed by applying a vessel material around the perimeter of the area.

3. A method defined by claim 2 comprising the step of removing the applied vessel material.

4. A method defined by claim 3, wherein the melting point of the vessel material is higher than the melting point of at least one of the at least two substances.

5. A method defined by claim 1, wherein the at least two substances are smeared after being applied.

6. A method defined by claim 1, wherein the at least two substances are applied in combination with a further substance that is selected from one or more of: a catalyst to catalyze the chemical reaction between the at least two substances, a phase change material for carrying one or more of the at least two substances, a colorant, and a tackifier.

7. A method defined by claim 1, wherein the at least two substances are applied in the form of droplets.

8. A method defined by claim 1, wherein applying the at least two substances within the area comprises projecting the at least two substances towards the area.

9. A method defined by claim 1, wherein the at least two substances are applied within the area such that the substances so applied are interspersed with each other.

10. A method defined by claim 1, wherein the formation of each of the plurality of sections comprises separately applying the at least two substances within the area.

11. A method for making an object, the method comprising the steps of:
    forming a plurality of sections of the object, wherein the formation of each of the plurality of sections comprises applying at least two substances within an area having the shape of the section being formed, the at least two substances being able to chemically react upon contact with each other to form the section; and
    forming a vessel arranged to contain the at least two substances within the area;
    wherein the at least two substances comprise at least one hydroxyl functional organosiloxane compound and at least one silane compound having an alkoxy or amine functional group and at least one silicone condensation cure catalyst compound.

12. A method defined by claim 11, wherein the vessel is formed by applying a vessel material around the perimeter of the area.

13. A method defined by claim 12 further comprising the step of removing the applied vessel material.

14. A method defined by claim 13, wherein the melting point of the vessel material is higher than the melting point of at least one of the at least two substances.

15. A method defined by claim 11, wherein the at least two substances are smeared after being applied.

16. A method defined by claim 11, wherein the at least two substances are applied in combination with a further substance that is selected from one or more of: a catalyst to catalyze the chemical reaction between the at least two substances, a phase change material for carrying one or more of the at least two substances, a colorant, and a tackifier.

17. A method defined by claim 11, wherein the at least two substances are applied in the form of droplets.

18. A method defined by claim 11, wherein applying the at least two substances within the area comprises projecting the at least two substances towards the area.

19. A method defined by claim 11, wherein the at least two substances are applied within the area such that the substances so applied are interspersed with each other.

20. A method defined by claim 11, wherein the formation of each of the plurality of sections comprises separately applying the at least two substances within the area.

* * * * *